United States Patent [19]
Wiegardt et al.

[11] Patent Number: 4,518,044
[45] Date of Patent: May 21, 1985

[54] VEHICLE WITH CONTROL SYSTEM FOR RAISING AND LOWERING IMPLEMENT

[75] Inventors: Gordon K. Wiegardt; Thomas W. Hanks; Carl E. Kittle, all of Cedar Falls, Iowa

[73] Assignee: Deere & Company, Moline, Ill.

[21] Appl. No.: 360,748

[22] Filed: Mar. 22, 1982

[51] Int. Cl.³ ........................................... A01B 63/112
[52] U.S. Cl. .............................................. 172/7; 172/3; 172/9; 180/197; 318/587; 364/424
[58] Field of Search ............... 172/2, 3, 4, 4.5, 7, 172/8, 9, 10, 11, 12; 37/DIG. 1; 180/197; 340/517, 519, 521, 522, 527, 529, 530; 364/433, 424; 318/587, 590, 611, 632, 633, 636, 646

[56] References Cited

U.S. PATENT DOCUMENTS

| 2,927,649 | 3/1960 | Poynor et al. | 172/2 |
|---|---|---|---|
| 3,246,701 | 4/1966 | Schulz | 172/9 |
| 3,516,498 | 6/1970 | Schowalter | 172/9 |
| 3,732,933 | 5/1973 | Foxwell et al. | 172/7 |
| 3,776,322 | 12/1973 | Misch et al. | 172/2 |
| 3,834,481 | 9/1974 | Carlson | 180/197 |
| 3,860,074 | 1/1975 | Maistrelli | 172/7 |
| 3,913,680 | 10/1975 | Carlson | 172/2 |
| 3,988,730 | 10/1976 | Valker | 340/519 X |
| 4,013,875 | 3/1977 | McGlynn | 364/424 |
| 4,064,945 | 12/1977 | Haney | 172/4 |
| 4,077,475 | 3/1978 | Hino et al. | 172/3 |
| 4,086,563 | 4/1978 | Bachman | 180/197 X |
| 4,223,302 | 9/1980 | Hocking | 340/517 X |
| 4,263,973 | 4/1981 | Boulais et al. | 172/4.5 |
| 4,282,933 | 8/1981 | Suganami et al. | 172/4.5 |
| 4,300,638 | 11/1981 | Katayama et al. | 172/10 |
| 4,301,870 | 11/1981 | Carre et al. | 172/7 |
| 4,343,365 | 8/1982 | Rajagopal et al. | 172/4 |
| 4,344,499 | 8/1982 | van der Lely et al. | 180/197 |

FOREIGN PATENT DOCUMENTS

| 923698 | 4/1973 | Canada | 172/7 |
|---|---|---|---|
| 2508620 | 8/1975 | Fed. Rep. of Germany | 172/7 |
| 2,411,559 | 9/1975 | Fed. Rep. of Germany | 180/197 |
| 2927585 | 4/1980 | Fed. Rep. of Germany . | |
| 2914605 | 10/1980 | Fed. Rep. of Germany . | |
| 812209 | 3/1981 | U.S.S.R. | 172/7 |

Primary Examiner—Richard T. Stouffer

[57] ABSTRACT

A tractor includes a hitch for pulling a ground-engaging implement. A hydraulic cylinder is extendable and retractable to lower and raise the implement. A control system senses operating parameters, including wheel slip, engine speed, draft force and implement or rackshaft position. Error signals derived from the sensed wheel slip, engine speed and draft force are combined into a composite or combined error signal. The larger of the combined error signal, or a separately determined position error signal, is selected and converted to a pulsewidth modulated valve control signal which is applied to a control valve which then actuates the cylinder to move the implement to reduce the magnitude of the selected error signal.

56 Claims, 9 Drawing Figures

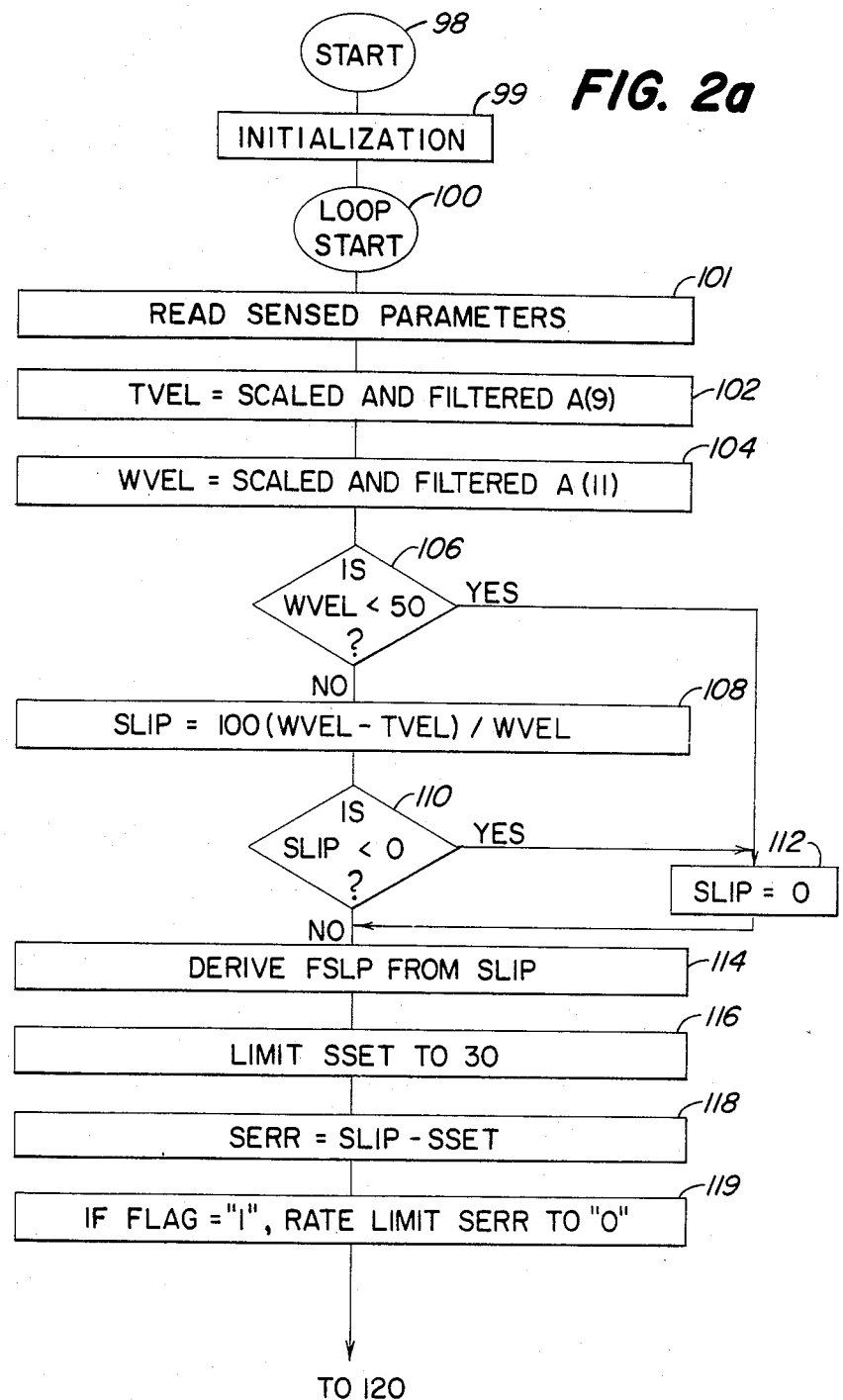

VEHICLE WITH CONTROL SYSTEM FOR RAISING AND LOWERING IMPLEMENT

BACKGROUND OF THE INVENTION

This invention relates to a control system for controlling the working depth of a tractor-coupled implement as a function of various sensed and operator-controlled parameters.

Most currently available hydromechanical implement control systems operate to control the working depth of the implement purely as a function of the implement position, purely as a function of the draft force sensed in the hitch linkages or as a mixed function of the sensed implement position and sensed draft force. Such control systems are limited in that they do not prevent excessive wheel slippage nor do they prevent engine stalling during certain adverse conditions. For example, with draft sensing only, the conventional draft force responsive control system may cause the engine to be lugged down and possibly stalled, due to inaccurate draft sensing, increased rolling resistance or burrowing of the drive wheels. It has been proposed, as disclosed in U.S. Pat. Nos. 2,927,649; 3,776,322; 3,834,481 and 3,913,680, to control the implement working depth purely as a function of the amount of slippage of the drive wheels, thereby using wheel slippage input as a substitute for a sensed draft force input. Of course, such systems do not provide the advantage of draft force control, nor do they necessarily prevent engine stalling. A rotary implement control system, described in U.S. Pat. No. 4,077,475, includes multiple independent control modes which are individually selected by a selector switch. These control modes include a sensed draft force only control mode, a sensed position only control mode, a manual control mode and a mixed control mode wherein the implement working depth is controlled in response to a mixture of hitch position and engine speed. Another control system is described in U.S. Pat. No. 3,860,074, wherein the control signal is the most positive of a draft error voltage and a position error voltage. However, these control systems do not provide protection against excessive wheel slippage in any of their modes. Furthermore, none of these control systems provide for hitch or implement control simultaneously as a function of sensed wheel slippage combined with other sensed parameters, such as sensed draft force or sensed engine speed. Finally, none of these control systems provide for automatically shifting or switching between one control mode, such as a pure position control mode, and a combined control mode wherein the hitch is controlled as a function of a combined signal representing sensed draft force and sensed wheel slip and engine speed.

SUMMARY OF THE INVENTION

An advantage of the present invention is that it provides improved implement position and draft control.

Another advantage of the present invention is that it provides a control system which can operate over a variety of field conditions without requiring frequent operator adjustments.

Another advantage of the present invention is that it provides for control of an earth-working implement as a function of a combination of sensed vehicle and machine parameters, such as wheel slippage and draft force.

Another advantage of the present invention is that it prevents excessive wheel slippage of a tractor pulling an implement while also controlling the implement working depth as a function of other variables.

Another advantage of the present invention is that in response to reduced engine speed, it counteracts implement lowering resulting from reduced travel speed.

Another advantage of the present invention is that it provides for implement depth control simultaneously as a function of sensed draft force, sensed wheel slippage and sensed engine speed.

A further advantage of the present invention is that it provides for implement depth control as a function of sensed hitch position and operator controls.

Another advantage of the present invention is that it provides a multi-mode implement controller which automatically selects or changes between its control modes, depending upon the status of sensed parameters.

A further advantage of the present invention is that it provides a lower position limit effective during both draft or position control, and an upper position limit effective only during position control.

Another advantage of the present invention is that it adjusts the implement working depth in response to the largest of an implement position error signal or of a combined error signal representing wheel slip in combination with other sensed parameters, such as draft force.

Another advantage of the present invention is that it provides a control system wherein parameter error signals are momentarily modified in response to a predetermined change in a command value which represents a desired value of an operating parameter of the system being controlled.

A further advantage of the present invention is that it provides a control system wherein parameter error signals are derived from sensed values and from set point values which are automatically redetermined after a predetermined operator-induced change in a command value which represents a desired value of an operating parameter of the system being controlled.

These and other advantages are achieved by the present invention which provides mechanisms for generating parameter error signals indicative of differences between sensed and reference values of operating parameters, such as driven wheel slippage, tractor engine speed, draft force and implement position. The draft, wheel slip and engine speed error signals are combined to form a composite or combined load error signal. The largest of the combined error and the position error signals is selected and applied to the input of an electrohydraulic control valve which controls fluid flow to and from a cylinder which raises or lowers the implement, thereby reducing the magnitude of the selected error signal. Means are provided for modifying the engine speed and wheel slip error signals in response to predetermined operator-induced changes in a load command setting which represents a desired level of draft force. Means are also provided so that various of the reference values are redetermined only upon expiration of a certain time period after the occurrence of the predetermined change in the load command setting.

BRIEF DESCRIPTION OF THE DRAWINGS

FIGS. 2a–g are flow charts of the algorithm performed by the central processing unit shown in FIG. 1.

DETAILED DESCRIPTION

Figure 1:
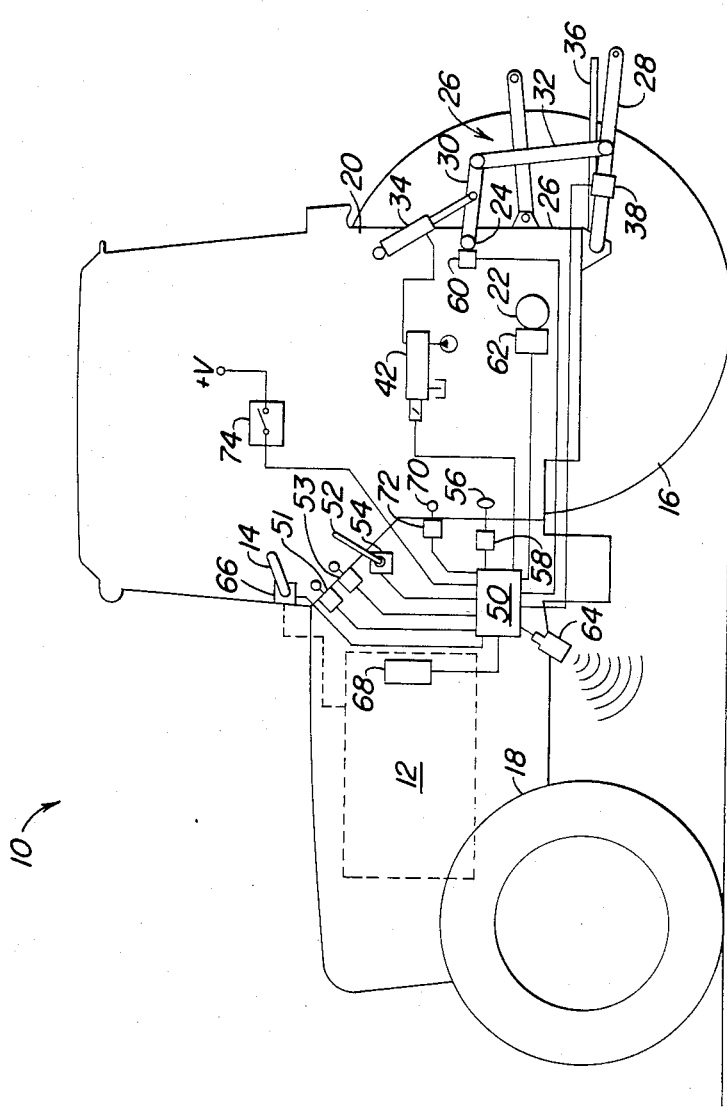
FIG. 1 is a simplified schematic of an agricultural tractor equipped with the present invention.
Figure 2B:
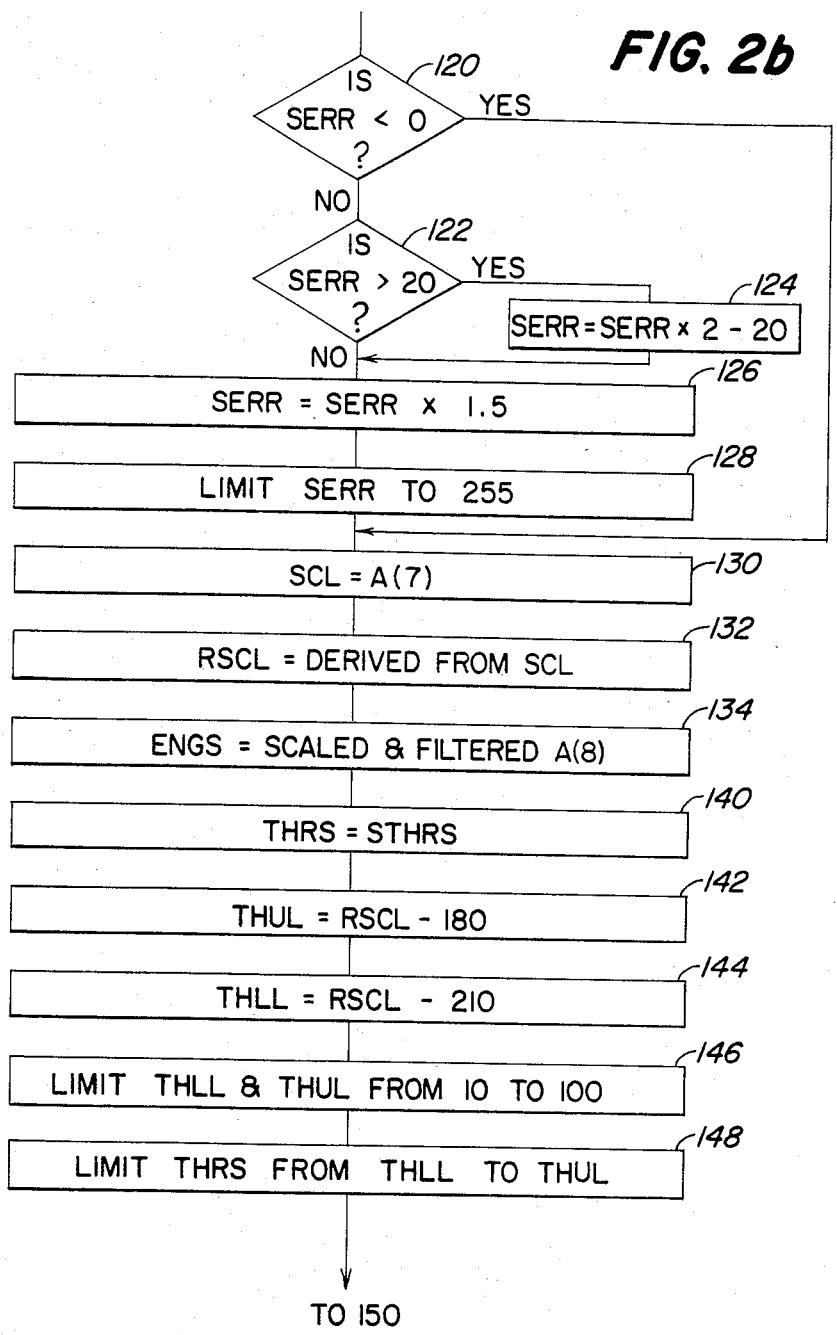
Figure 2C:
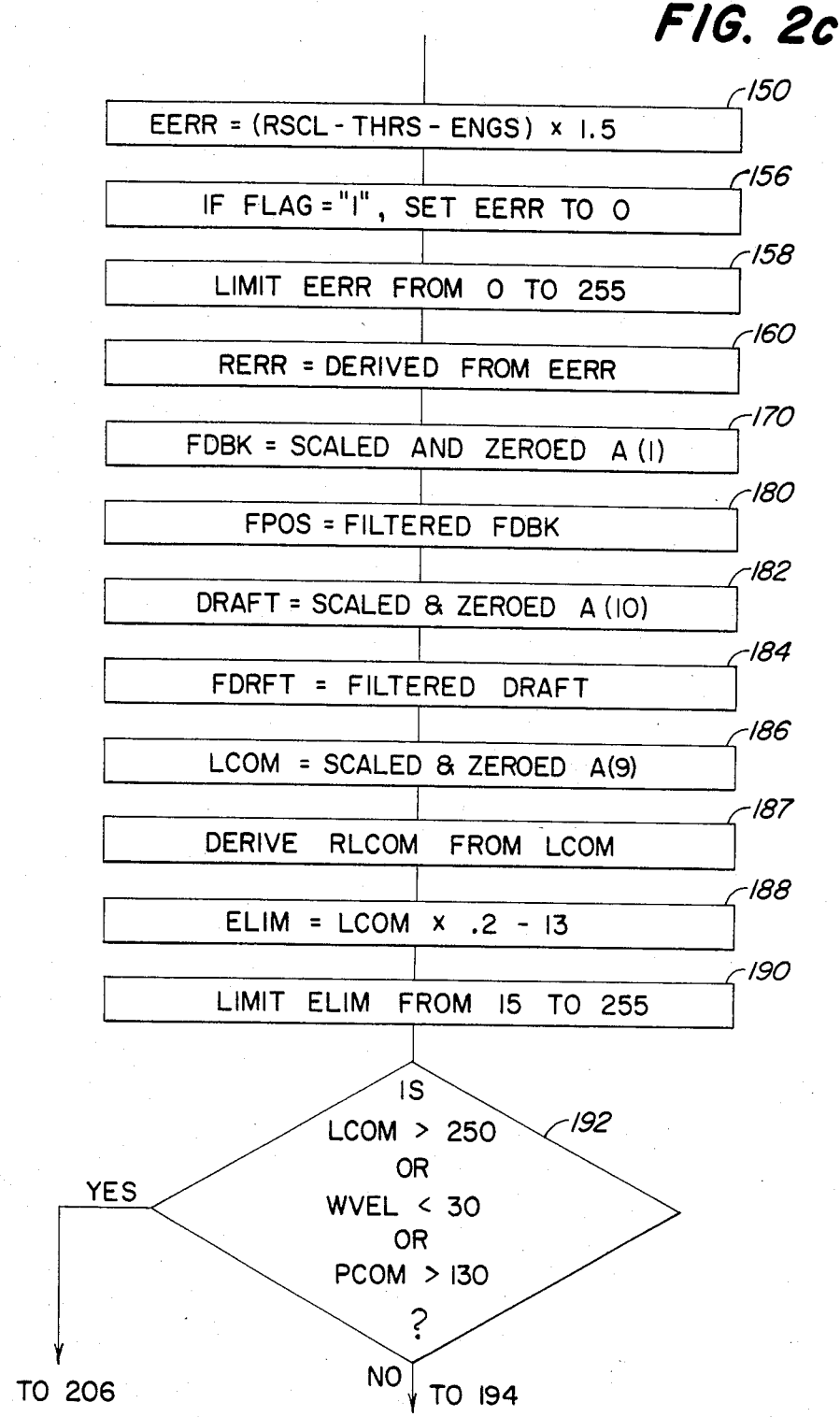
Figure 2D:
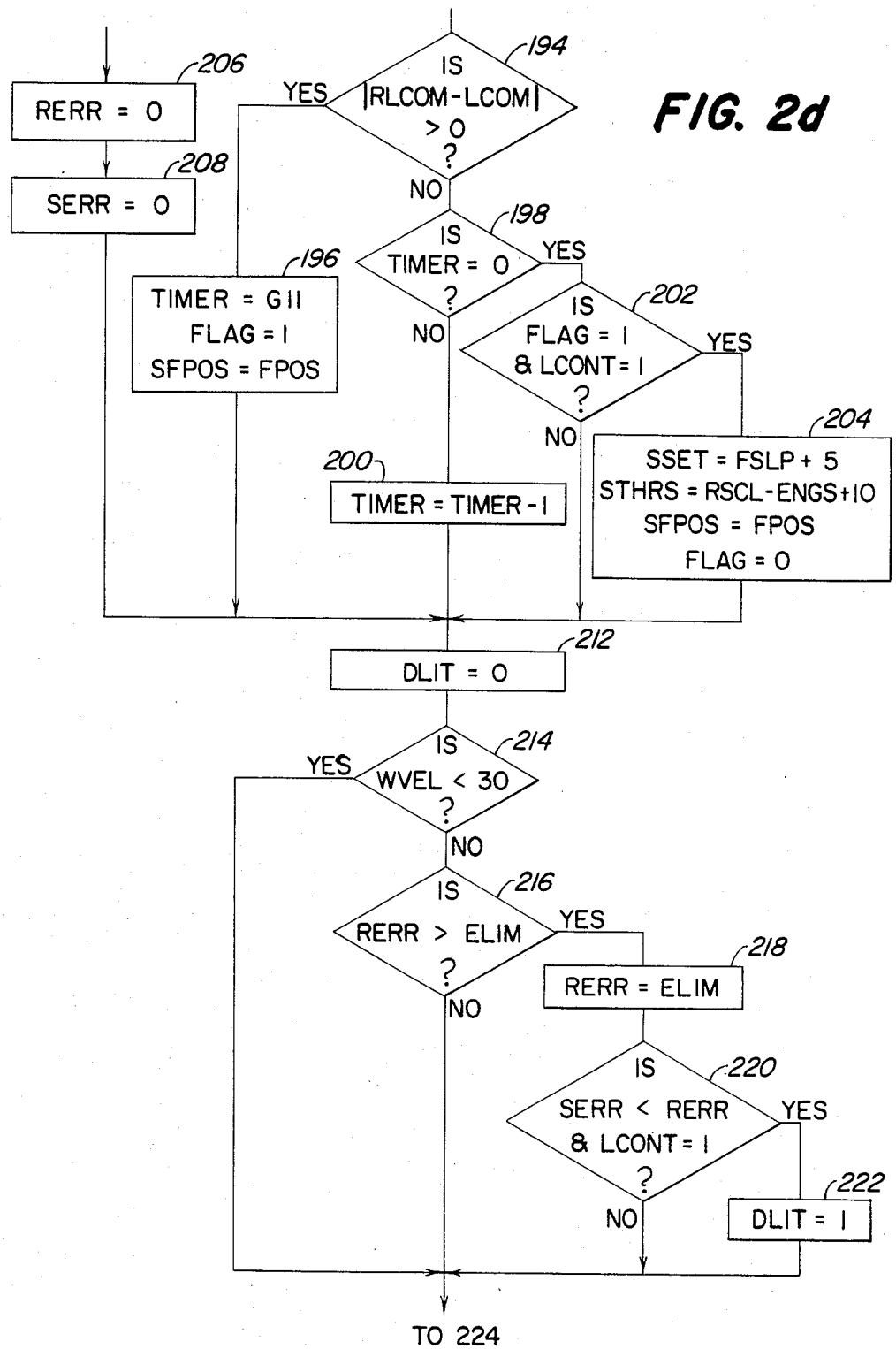
Figure 2E:
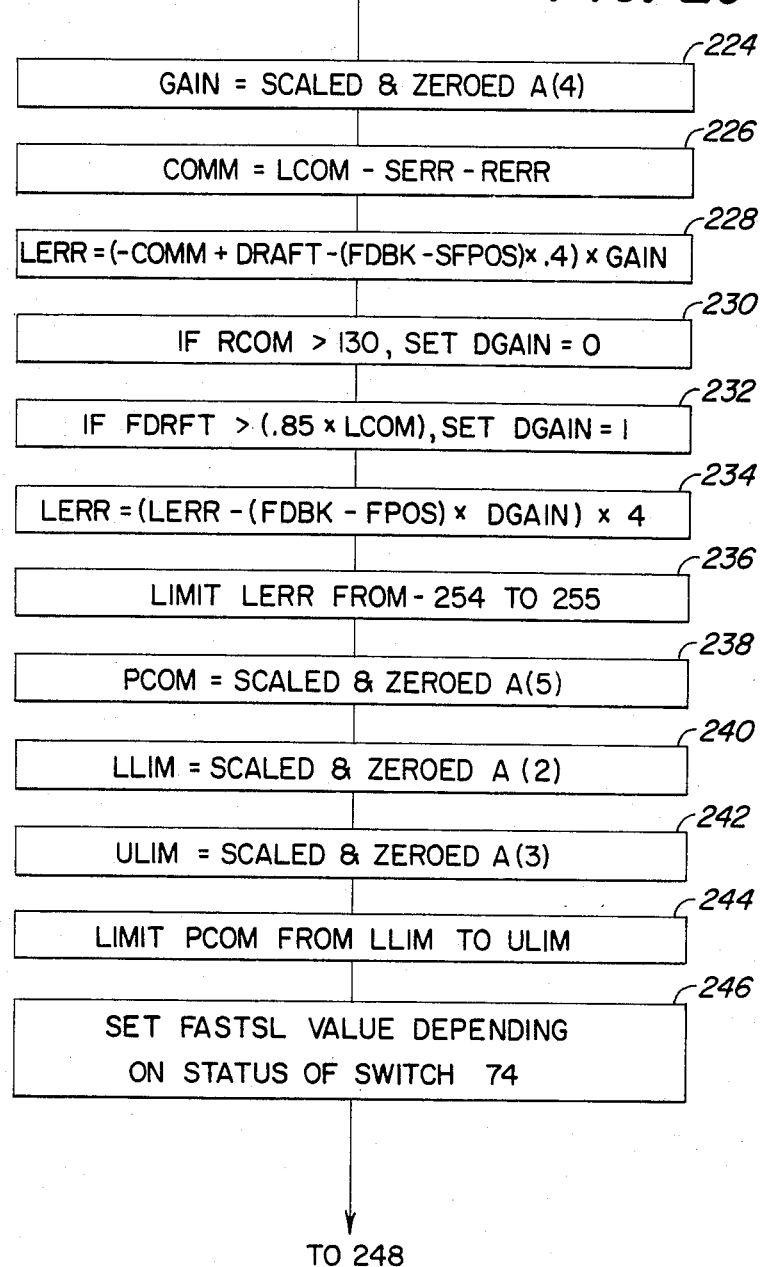
Figure 2F:
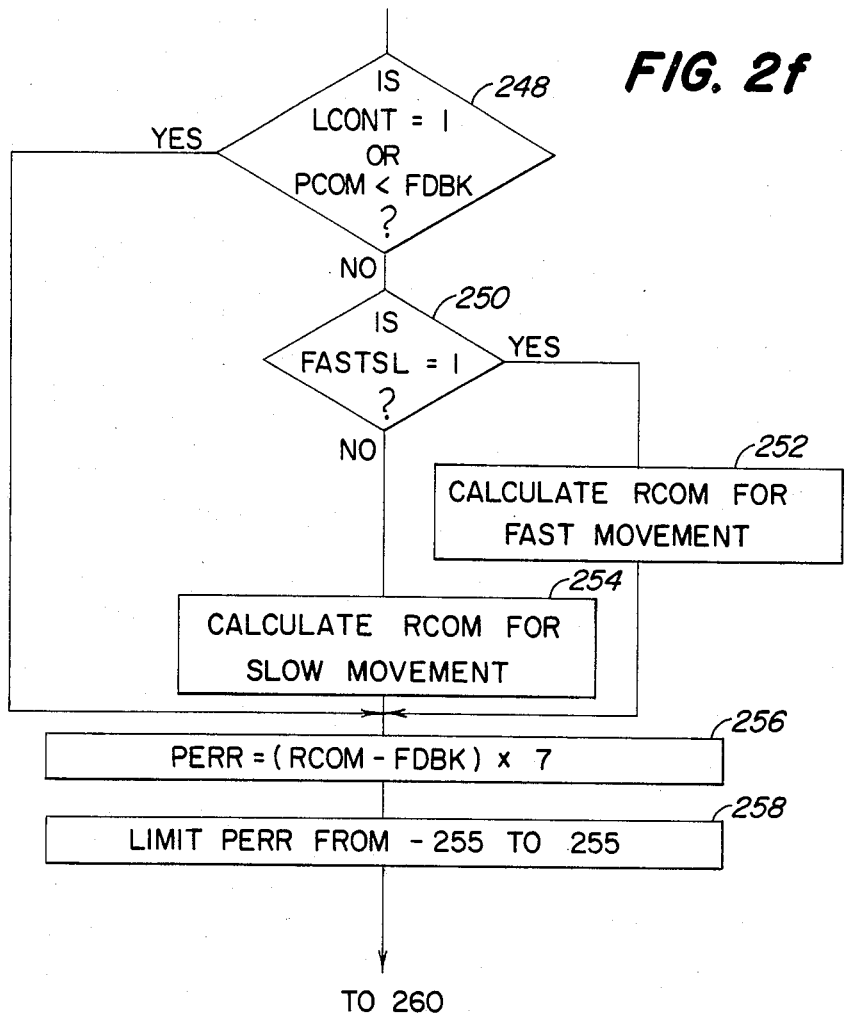
Figure 2G:
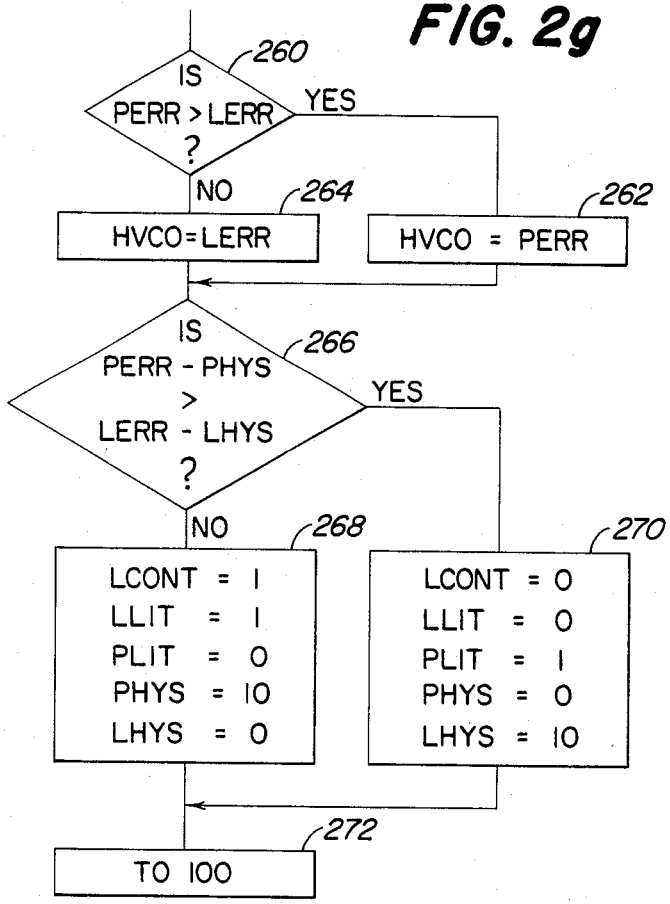

A tractor 10 includes an engine 12 controlled by a speed control lever 14, a pair of driven wheels 16 and a pair of non-driven wheels 18. A rear housing 20 supports a rear axle 22 and a rockshaft 24. An implement hitch 26, such as a conventional 3-point hitch, includes draft links 28 which are connected to lift arms 30 via lift links 32. The lift arms 30 are connected to the rockshaft 24 to insure simultaneous and equal movement and are raised and lowered via a pair of parallel connected hydraulic lift or rockshaft cylinders 34. A drawbar 36 extends rearwardly from the housing 20. The tractor 10 and the hitch 26 are merely exemplary and those skilled in the art will understand that the invention can be applied to tractors and hitches of other configurations. For example, this invention can be used on an articulated four-wheel drive tractor or on a front-wheel drive row-crop tractor.

An integral-type, ground-engaging implement (not shown), such as a moldboard plow or a chisel plow, may be attached in a conventional manner to the draft links 28. Alternatively, a towed implement (not shown) may be coupled to the drawbar 36. Draft sensors 38 may be interposed in the hitch 26, for example, in the draft links 28, to sense the draft force transmitted to the draft links 28 from the integral implement. If a plurality of draft sensors are interposed in the hitch 26, then a single draft representative signal may be obtained by combining together the separate signals from the plurality of sensors 38. In the case of a towed implement, the draft force may be sensed with a draft sensor interposed in the drawbar 36, or with a T-bar coupled to the draft links. In either case, any suitable known draft sensor would suffice.

The communication of hydraulic fluid to and from the cylinders 34 or to and from a remote cylinder (not shown) on a towed or semi-integral implement is controlled by a conventional solenoid-operated electrohydraulic flow control valve 42 which receives electrical control signals generated by a control unit or central processing unit 50, which may include a digital microprocessor, analog-to-digital converters, multiplexers and/or other equivalent conventional hardware components. The flow control valve 42 may be comprised of a commercially available MOOG-type servo-valve with a torque motor-operated pilot stage and an integral second stage. The output hydraulic flow rate is substantially proportional to the magnitude of the electrical current applied to the torque motor of the valve 42.

An operator-controlled position command lever 52 is coupled to a lever position transducer 54 (such as potentiometer) which generates a position command signal which represents a desired hitch or implement position. Electrical upper and lower position reference or limit signals are provided by operator-adjustable potentiometers 51 and 52. Alternatively, adjustable mechanical stops or limits (not shown) could be provided to mechanically limit the position of control lever 52 and thus, limit the signal from potentiometer 54. A manually-operable load command knob 56 is coupled to a potentiometer-type load transducer 58 which generates a load command signal representing a desired level of draft force.

A position transducer 60, such as conventional rotary potentiometer, generates a sensed position signal which represents the actual sensed position of the rockshaft. A position feedback signal could also be obtained from the lift cylinder 34 or from a remote lift cylinder if that cylinder includes a position transducer, such as described in U.S. Pat. No. 3,726,191, for example.

A conventional rotation speed sensor 62, such as a Motorola magnetic pickup, generates a wheel speed signal which represents the rotation speed of the rear axle 22 and the driven wheels 16. In the case of the magnetic pickup, a signal is generated with a frequency proportional to the wheel speed. A ground speed sensor 64, such as a commercially available doppler radar-type unit, generates a ground speed signal which represents the actual ground speed of the tractor 10. The radar ground speed signal also has a frequency proportional to the ground speed of the vehicle. As an alternative, a fifth wheel or a rotation speed sensor for a non-driven wheel could also be used for this purpose. Suitable conversion factors may be applied by the central processing unit 50 to these speed signals to convert them to comparable units.

A speed control lever position sensor 66, such as a potentiometer coupled to the speed control lever 14, generates a signal which represents a desired engine speed. Alternatively, it would be possible to obtain a desired engine speed signal from the setting of an engine governor. Another conventional rotation speed sensor 68, such as an instrumentation-type tach generator or a magnetic pickup, generates an engine speed signal with a frequency proportional to the actual rotation speed of the engine 12.

An operator-controlled activity control 70 is coupled to a transducer 72, such as a potentiometer, for generating a variable gain signal which is communicated to the central processing unit 50. Also, an operator-controlled, rate-selecting switch 74 may be opened and closed by the vehicle operator to select slow and rapid rates of implement movment.

Figure 3:
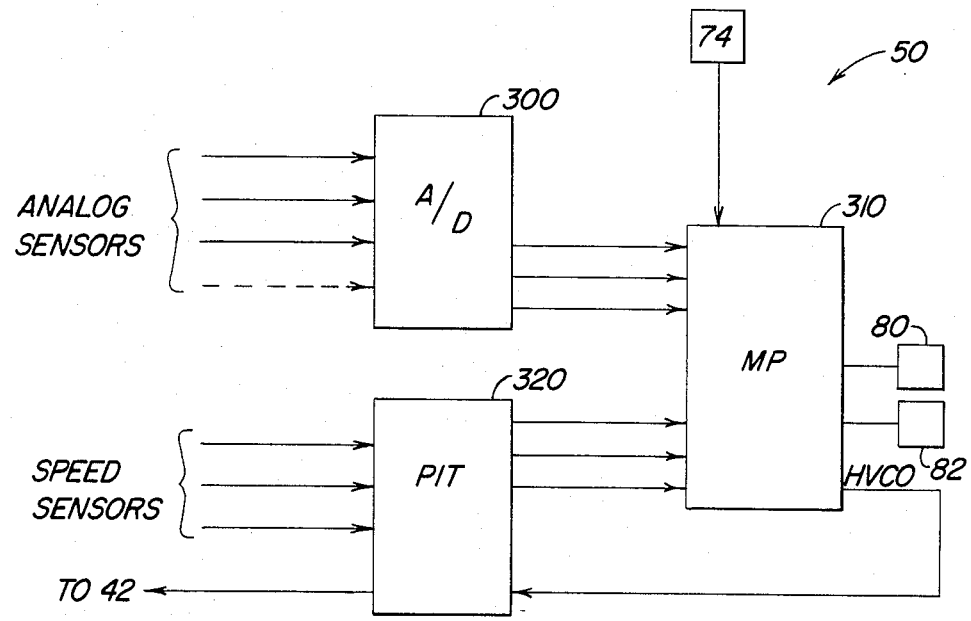
FIG. 3 is a simplified schematic representation of a central processing unit suitable for use in the present invention.

As shown in FIG. 3, in the preferred case where the central processing unit 50 includs a digital microprocessor, a suitable central processing unit 50 could be comprised of a conventional analog-to-digital convertor with multiplexer 300, a microprocessor 310 and a programmable interval timer (PIT) 320. The A/D convertor 300 would convert the analog signals from transducers 38, 51, 53, 54, 58, 60, 66 and 72 to digital representations for communication to the microprocessor 310. The PIT 320, such as an AMD 9513, would convert the square-wave signals from speed sensors 62, 64 and 68 to digital representations, also for communication to the microprocessor 310. The microprocessor 310, such as an Intel 8751 or T.I. 9940, would generate digital HVCO values according to the algorithm described in detail hereinafter. Finally, the PIT 320 would convert the digital HVCO values to pulse-width modulated valve driving signals for driving the conventional torque motor controlled valve 42 to retract and extend the cylinders 34 and raise and lower the implement (not shown) attached thereto. The control unit 50 could be implemented with other hardware configurations as well. For example, the microprocessor 310 could include internal memory, or memory could be external to the microprocessor 310, or a latch could be inserted between the microprocessor 310 and the indicating devices 80 and 82. Appropriate scaling factors are applied to the signals from all the sensors so that their minimum and maximum values are represented by digital counts of 0 and 255, respectively. In this manner, the system has the capability of responding to changes in the input variables as small as approximately 0.4% and the variables can be stored in 8-bit registers.

Conventional EMI filters could be in various portions of the lines connected to the control unit 50 to filter out electromagnetic interference.

The sequence of calculations performed by the central processing unit 50 is described next, with reference to the flow charts shown in FIGS. 2a-g and the following tables:

| CENTRAL PROCESSING UNIT INPUT TABLE | |
|---|---|
| INPUT | NAME |
| A(1) | Hitch position (from sensor 60) |
| A(2) | Lower position limit (from sensor 53) |
| A(3) | Raise position limit (from sensor 51) |
| A(4) | Activity control (from sensor 72) |
| A(5) | Hitch position command (from sensor 54) |
| A(6) | Draft load command (from sensor 58) |
| A(7) | Speed control lever position (from sensor 66) |
| A(8) | Engine speed (from sensor 68) |
| A(9) | Ground speed (from sensor 64) |
| A(10) | Draft sensor (from sensor 38) |
| A(11) | Rear wheel speed (from sensor 62) |

The flow charts shown in FIGS. 2a-g include abbreviations and acronyms which are more fully described later, but which are initially defined as follows:

| | |
|---|---|
| COMM | Interim combined command value |
| DGAIN | Dynamic gain value |
| DIFF | Engine speed error differential |
| DLIT | Downshift light |
| DRAFT | Draft force (sensed) |
| EERR | Engine speed error |
| ELIM | Engine speed error limit |
| ENGS | Engine speed |
| FASTSL | Implement movement rate flag |
| FDBK | Position feedback |
| FDRFT | Filtered draft force |
| FLAG | Load command change flag |
| FPOS | Filtered position feedback |
| FSLP | Filtered slip |
| GAIN | Activity gain value |
| HVCO | Valve command |
| LCOM | Load command |
| LCONT | Load control mode flag |
| LERR | Load or combined error |
| LHYS | Load hysteresis |
| LLIM | Lower position limit |
| LLIT | Load light |
| PCOM | Position command |
| PERR | Position error |
| PHYS | Position hysteresis |
| PLIT | Position light |
| RCOM | Rate limited position command |
| RERR | Rate limited engine speed error |
| RSCL | Rate limited speed control lever position |
| SCL | Speed control lever position |
| SERR | Slip error |
| SFPOS | Stored filtered position feedback |
| SLIP | Driven wheel slip |
| SSET | Slip set point |
| STHRS | Stored engine speed threshold |
| THLL | Engine speed threshold lower limit |
| THUL | Engine speed threshold upper limit |
| THRS | Threshold (engine speed) |
| TIMER | Load command change delay timer |
| TVEL | Tractor velocity (ground speed) |
| ULIM | Upper position limit |
| WVEL | Rear wheel velocity |

The major portions of the flow chart, shown in FIGS. 2a-g, can be summarized as follows: The slip error value, SERR, is generated via steps 102-128. The filtered engine error value, RERR, is generated via steps 130-160. The position feedback and filtered position feedback values, FDBK and FPOS, are generated via steps 170 and 180. A sensed draft force value, DRAFT, is generated by step 182. A value representing a desired amount of draft force, LCOM, is generated by step 186. Via steps 194, 196, 119, 156 and 160, the wheel slip and engine speed error values are momentarily modified whenever the operator makes a predetermined change in the load command control 56. This permits the draft control operating points to be set in steps 224-236 without undue interference from the wheel slip and engine speed error inputs to assure that the draft force responsive aspect of this control system is normally the primary or dominant control aspect.

The central processing unit 50 enters into its routine at a step 98, whereupon the following initial conditions are established at step 99.
DRAFT=0
ENGS=0
FDRFT=0
FLAG=0
FPOS=0
FSLP=0
LCONT=0
LHYS=0
PCOM=0
PHYS=0
RCOM=0
RERR=0
RSCL=0
SSET=30
STHRS=45
TIMER=0
TVEL=0
WVEL=0

The main processing loop is entered at step 100 and is followed by step 101, wherein the values A(1)-A(11) are obtained or read from operating parameter sensors and from the operator-controlled adjustments. It will be evident that various off-setting or compensation factors can be applied to these values representing the sensed parameters to compensate for errors in calibration or adustment of the sensors. Then, in step 102, a filtered tractor velocity (ground speed) value TVEL is calculated from the statement TVEL=(3×TVEL+A(9))/4, where the TVEL value of the right side is the initial value set in step 99 or the value established in step 102 of a previous cycle of the routine, where A(9) is the sensed ground speed value from sensor 64. Thus, the TVEL value is a weighted average of a previous TVEL value and the current sensed ground speed value.

Next, at step 104, a scaled and filtered rear wheel velocity value WVEL is derived from the current rear wheel speed input value A(11) from sensor 62 by the statement WVEL=(3×WVEL+A(11))/4. At step 106, the rear wheel velocity, WVEL, is compared to a reference value of 30, which is a digital number representing a speed of 0.3 meters per second. If WVEL is less than 0.3 meters per second, then the program proceeds to steps 112 and 114. If WVEL is not less than 0.3 meters per second, then the routine goes to step 108 where a SLIP value is calculated from the statement SLIP=100 (WVEL−TVEL)/WVEL. Thus, the SLIP value varies between zero and 100, as a percentage figure. Following step 108, the SLIP value is compared to 0 in step 110. If the SLIP value is less than 0, then SLIP is set equal to 0 at step 112. If the SLIP is not less than 0, then the routine proceeds to step 114. In this manner, the value of SLIP will be greater than or equal to zero for the subsequent calculations in the routine.

At step 114, a filtered slip value, FSLP, is derived from the statement $FLSP = (127 \times FLSP + SLIP)/128$. Thus, the updated filtered FLSP value is a weighted average of the previously FLSP value (initially 0 or as set in step 114 of the previous cycle), and the most recently determined SLIP value from step 108 or 112. The weighting factors described here prevent rapid fluctuations in the FLSP value in response to short duration fluctuations in the SLIP value.

Next, at step 16, a maximum value, representing, for example, 30% wheel slippage, is established as an upper limit for the slip set value, or reference slip value, SSET, initially 30 or set by step 204 of a previous cycle of the routine. In this manner, the SSET value is limited to a maximum value representing 30%, but it can be less.

Next, a step 118, the slip error value SERR is calculated from the statement $SERR = SLIP - SSET$. Thus, the slip error value, SERR, is the difference between the actual wheel slippage value, SLIP, and the slip reference value, SSET.

Next, at a portion of the routine represented by step 119, if a FLAG value is equal to 1 (as set in step 196 of a previous routine cycle), then the slip error value, SERR, is rate limited down to a zero value. More particularly, the SERR value is incrementally decreased during each cycle of the routine by an amount which increases uniformly so that the SERR value will be decreased gradually without any significant discontinuities, and as a substantially parabolic function of time. The increments are chosen so that normally the rate limited SERR value would be reduced to zero in a time period of the order of 0.2–0.5 seconds.

Next, at steps 120–128, a dual slip error gain is established, depending upon the magnitude of the slip error value, SERR, as determined in step 118 or 119. For example, if, in step 120, SERR is less than zero, then the routine proceeds directly to step 130 and the unmodified SERR value from step 118 is used in the remainder of the routine. However, if SERR is not less than zero, then SERR is compared to a value such as 20 in step 122. If SERR is greater than 20, then a new SERR value is obtained from steps 124 and 126 so that the new SERR value is equal to $1.5 \times ((\text{old SERR value} \times 2) - 20)$. However, if SERR is not greater than 20 in step 122, then the routine proceeds directly to step 126 where the gain factor 1.5 is applied to the SERR value. In this manner, the control system is able to respond more rapidly to larger magnitudes of wheel slippage represented by the SERR value. The values of the gain factors in steps 124 and 126 may be experimentally determined to achieve the desired sensitivity of the system to wheel slippage. The particular values may vary, depending upon the particular vehicle and implement involved. Following step 126, and upper limit 255 is established for the SERR value to prevent overflow of the 8-bit register containing that value.

At step 130, the speed control lever position value, SCL, is derived from the value A(7) from the speed control lever position transducer 66, so that, for example, 1 count of SCL represents 10 rpm of engine speed. Next, in a portion of the routine represented by step 132, a rate limited speed control lever value, RSCL, is derived from the SCL value in step 130. Specifically, the RSCL value (initially set at 0 in step 99) is changed during each cycle of the routine by an amount which is proportional to changes in the spaced control lever position as represented by changes in the values A(7) and SCL. If the speed control lever position is changing in the direction corresponding to increasing engine speed, then the incremental increase in the RSCL value during each cycle of the routine is limited so that the RSCL value can increase no faster than a rate corresponding to a rate of increased engine speed of, for example, 700 rpm per second. The RSCL value is not rate-limited when the speed control lever is moved in the direction representing a lowering of the engine speed. As will be seen from later steps in the routine, this rate limit on the RSCL value will, in the event of a rapid advance of the speed control lever, limit the engine speed error value, EERR, by limiting the updated rate limited speed control value RSCL, and eventually prevent undesirable raising of the hitch in response to a rapid advance of the engine speed control lever.

At step 134, the updated engine speed value, ENGS, is calculated from the statement $ENGS = (3 \times ENGS + A(8))/4$, where A(8) is the value from the engine speed sensor 68, and where the ENGS value on the right is initially zero from step 99 of is set at step 134 of a previous cycle of the routine. The ENGS value is scaled so that 1 count represents 10 rpm.

Next, at step 140, an engine speed threshold value, THRS, is assigned the value of the stored engine speed threshold value, STHRS, which is initially 45, in step 99, corresponding to a deadband of 450 rpm, or is set in step 204 of a previous cycle of the routine. Then, in steps 142 and 144, upper limit and lower limit threshold values, THUL and THLL, respectively, are derived from the rate limited speed control lever value, RSCL. Next, in step 146, minimum and maximum values 10 and 100, respectively, are established for both the THLL and THUL values. Finally, in step 148, the THLL and THUL are established as minimum and maximum values, respectively, for the engine speed threshold value, THRS, for use in calculating the engine speed error EERR in later step 150.

In step 150, an engine error (or droop) value, EERR, is calculated from the statement $EERR = (RSCL - THRS - ENGS) \times 1.5$, where RSCL is the rate limited speed control lever position value from step 132, THRS is the engine speed threshold value from steps 140–148 and 1.5 is an engine error gain or sensitivity factor chosen so that the system is suitably sensitive to variations in the engine speed. The terms RSCL−THRS in step 150 can be viewed as an engine speed set point below which the engine speed value, ENGS, must fall before a positive EERR value will be generated. (Negative EERR values are ignored due to later step 158.) This set point value will always be smaller than the RSCL value by the amount of the THRS value, which, due to steps 140–148, can vary between 10 and 100 representing rpms of 100 and 1000, respectively. By maintaining this set point always a certain amount less than the speed control lever position represented by the RSCL value, the implement is prevented from being continuously raised and lowered in response to the normal continuous and minor fluctuations in the engine speed of the tractor. The minimum threshold value established in steps 140–148 prevents too small a THRS value from being used in step 150 if the load command control 56 is adjusted when the speed control lever 14 is at reduced engine speed settings. The maximum threshold value established in steps 140-148 prevents too large a THRS value from being used in step 150 when the speed control lever 14 is moved to reduced engine speed settings after a stored thresold value, STHRS, has been set in step 204 when the speed control lever 14 is at large engine speed settings.

Then, in step 156, the EERR value is set equal to 0 if the FLAG value is equal to 1, as would be the case if it were set equal to 1 in step 196 of a previous cycle of the routine in response to a change in the LCOM value. Next, in a portion of the routine represented by step 158, lower and upper limits, 0 and 255, respectively, are established for the range of possible EERR values. As mentioned previously, step 158 prevents a negative EERR value from influencing the hitch and/or implement and prevents any overfow in the eight bit register containing the EERR value.

Next, in a portion of the routine represented by step 160, a rate limited engine speed error value, RERR, is derived from the engine speed error value, EERR. In short, when the EERR value is increasing, then the RERR value is incrementally increased each cycle of the routine by a constant amount which can be no greater than an amount corresponding to a rate of changes of, for example, 420 rpm per second. Alternatively, if the EERR value is decreasing, or if the EERR is reduced to zero at step 156, then the RERR value is incrementally decreased each cycle of the routine by an amount corresponding to a rate of change of, for example, 160 rpm per second. Thus, the RERR value will increase or decrease in a linear fashion as a function of time. The rate limited engine speed error value RERR is then used later in the routine in the determination of the load or combined error value, LERR. In this manner, the sensitivity of the system to changes in engine speed, that is, the rate at which the implement is raised in response to a deteriorating or lugged-down engine speed and the rate at which the implement is lowered in response to a recovering engine speed, is limited to achieve a more stable control system by preventing over-shoot and hunting. The limits are different under the deteriorating and recovering engine speed situations because it has been found to be desirable to permit a faster implement raising speed to prevent engine stalling, while the slower implement lower speed is desirable for system stability.

At step 170, the position feedback value, FDBK, is derived from the sensed position value A(1). Calibration factors are applied to the A(1) input to assure that the range of possible positions sensed by position sensor 60 will provide FDBK values with digital counts ranging from 0 to 255. The calibration factors will vary, depending upon the type of position sensor and particular linkage structure between the position sensor and the implement. Then, in step 180, a filtered position value is determined according to the statement FPOS=(127×FPOS+FDBK)/128 so that the filtered position value FPOS is a weighted average of the FDBK value from step 170 and the initial FPOS value of zero or the FPOS value set at step 180 of a previous cycle of the routine. The FDBK and FPOS values are employed later in the routine to determine a normalized position feedback term which becomes part of the combined load error value, LERR, while the FDBK value is used later to determine a position error value, PERR.

Next, in step 182, a sensed draft force value DRAFT is determined by the statement DRAFT=(DRAFT+A(10))/2, so that the DRAFT value set in step 182 is an evenly weighted average of the input A(10) from draft sensor 38 and the DRAFT value which is initially zero or is set in step 182 of a previous cycle of the routine. Next, in step 184, a filtered draft value FDRFT is determined by the statement FDRFT=(127×FDRFT+DRAFT)/128 so that the FDRFT value set in step 184 is a weighted average of the DRAFT value from step 182 and the initial FDRFT value of zero or the FDRFT value set at step 184 of a previous cycle of the routine. This DRAFT value is also employed later in the routine to determine the load or combined error value, LERR. THe FDRFT value is employed later in step 232 in determining a DGAIN value.

In step 186, a scaled and zeroed load command value, LCOM, is derived from the A(6) input of the load command sensor 58 so that LCOM values from 0 to 255 represent the full range of positions of the load command sensor 58.

In a portion of the routine represented by step 187, a rate-limited load command value, RLCOM, is derived from the LCOM value. In short, the RLCOM value is incremented or decremented each cycle of the routine in response to an increasing or a decreasing, respectively, in the LCOM value. The increment and decrement are chosen so that for a maximum possible step change in the load LCOM value, the RLCOM value will attain the new LCOM value on the order of approximately 6 to 8 seconds.

In step 188, an engine error limit value, ELIM, is calculated according to the statement ELIM=(-LCOM×0.2)−13, where 0.2 and 13 are experimentally determined scaling and offset factors. The ELIM value is used later in steps 216 and 218, as described later in this description. Then, in step 190, lower and upper limits 10 and 255, respectively, are established for the ELIM value.

Next, in step 192, the LCOM value is compared to 250, the WVEL value is compared to 30 and the PCOM value is compared to 130. If the LCOM value is greater than 250, or if the WVEL is less than 30, or if the PCOM value is greater than 130, then the routine proceeds to steps 206 and 208 where the engine error, RERR, and slip error, SERR, values are both set equal to 0, after which the routine proceeds to step 212. Step 192 bypasses steps 194–204 to prevent recalculation of the set points in step 204 when a large draft force setting is chosen (LCOM>250), when the vehicle is not moving (WVEL>30) and when the hitch and implement are raised out of the ground (PCOM>130). Steps 192 and 206–208 also reduce the effect of wheel slip and engine droop under these same conditions. However, if none of these conditions are met, then the routine proceeds to step 194.

In step 194, the LCOM value is examined to determine if the operator is changing the setting of the load command knob 56, by comparing to zero the absolute magnitude of the difference between the rate-limited load command value, RLCOM, and the load command value, LCOM. If this difference is non-zero, then from step 194, the routine proceeds to step 196. In step 196, a countdown counter or timer is initialized to a value, G11, which represents a minimum set point delay time period of, for example 120 mlliseconds. Also, in step 196, the FLAG value is set equal to 1 and a stored filtered position value, or reference position value, SFPOS, is assigned the value of FPOS from step 180. After step 196, the routine proceeds to step 212.

However, if (RLCOM−LCOM) equals zero in step 194, then the routine proceeds to step 198. Step 198 determines whether the counter set in step 196 has been counted down to zero. If the counter has not been counted down to zero, then the routine proceeds to step 200, where the timer is decreased by 1 count, after which the routine proceeds to step 212. If the counter has counted down to zero in step 198, then the routine proceeds to step 202 where the value FLAG is compared to 1 and a load control mode value LCONT value is compared to 1. If, in step 202, both the FLAG and LCONT values are not equal to 1, then the routine proceeds to step 212. However, if both the FLAG and LCONT values are equal to 1, then the routine proceeds to step 204, where various set point values are calculated for use in other portions of the routine. For example, the slip set value, SSET, is set equal to the sum of the filtered slip value, FSLP, (from step 114) plus 5. In this manner, wheel slip, which is less than 5% above the average slip value, FSLP, will not cause the implement to raise. The stored engine speed threshold value, STHRS, is determined by the statement STHRS=RSCL−ELIM+10. Also, the stored filtered or reference position value, SFPOS, is assigned the filtered position value FPOS to provide an operating reference for the draft control position feedback term in later step 228. Finally, in step 204, the changing load command flag value, FLAG, is set equal to 0 so that step 202 will prevent recalculation of the various set point values unless the FLAG value is reset to 1 at step 196 in a subsequent cycle of the routine. Thus, in response to a change in the signal from the load command transducer 58, the SERR and RERR values are momentarily modified or reduced towards 0 by operation of steps 119 and steps 156 and 160, respectively. Then after expiration of a certain variable delay period following such a change in the load command signal, the set point values SSET and STHRS are recalculated. The recalculated set point values are maintained until they are again recalculted in response to another change in the load command signal.

This variable delay period will be the minimum delay period represented by the G11 value when the load command changes are small. However, larger changes in the LCOM value will require a longer time for the RLCOM value to "catch up" to the new LCOM value, on the order of a few seconds, due to step 187. Thus, step 194 will prevent step 204 from recalculating the set points until this longer delay time of a few seconds has expired. Furthermore, due to step 187, this longer delay period will be proportional to the amount of change in the LCOM value. In this manner, steps 194–204 operate to momentarily reduce the engine speed and wheel slip error values towards zero whenever the operator makes a predetermined change in the load command control 56. This is done so that the draft control operating point can be set in steps 226, 228 and 234 without interference from the wheel slip and engine speed error inputs. This assures that the draft force responsive aspect of this control system is normally the primary or dominant control aspect.

Also, when a change occurs in the load command value, LCOM, the reference position value, SFPOS, will be repeatedly redetermined or set equal to the current filtered position value, FPOS, in steps 196 or 204, until the rate limited load command value, RLCOM, re-attains the value of LCOM, whereupon the reference position value, SFPOS, will remain unchanged for use as a reference value for the normalized position feedback term (FDBK−SFPOS) for use in step 228 until new changes in the LCOM value occur. Since the FPOS value will normally be only slightly different from the FDBK value, it follows that this normalized position feedback term (FDBK−SFPOS) will have a modified or reduced value and effect in step 228 as long as the RLCOM value is "catching up" to the new LCOM value as a result of a change in the LCOM value. Furthermore, since the SFPOS value follows the smoothly changing FPOS value, abrupt changes or discontinuities in the LERR value in step 228 are prevented, thus resulting in a smooth implement control characteristic. After step 204, the routine proceeds to step 212 where a downshift light value, DLIT, is set to 0.

Next, at step 214, the wheel velocity value, WVEL, is compared to a value 30 which represents, for example, a 0.3 meters/sec. tractor velocity. If WVEL is less than 30, the routine proceeds directly to step 224. However, if WVEL is not less than 30, then the routine proceeds to step 216 where the rate limited engine speed error value RERR is compared to the ELIM value. If the RERR value is not greater than the ELIM value, then the routine proceeds directly to step 224. However, if RERR is greater than ELIM, then the routine proceeds to step 218, where the RERR value is assigned the value of ELIM, thereby limiting the engine error value, RERR, to the ELIM value, which, as set in step 188, is proportional to the setting of the load command knob, as represented by the LCOM value. After that, the routine proceeds to step 220.

Thus, in the situation where the tractor and implement start to go up a hill, the implement draft force and the resulting DRAFT value from step 182 may decrease due to the decreased velocity of the tractor and implement, Now, in ordinary draft control systems, a reduction in sensed draft force tends to cause a lowering of the implement. However, with the present system, as the engine speed decreases, the resulting engine error value, RERR, will increase. This increased RERR value will increase the combined load error value LERR in step 228, thus countering the effect of the reduced draft force caused by the reduced ground speed. If the tractor continues to lose ground speed because of the severity of the hill, and the RERR value becomes equal to ELIM, then RERR will be set equal to ELIM, and the hitch will be prevented from further raising the implement. In this situation, it would be preferable for the operator to increase the engine speed, and thus reduce the RERR value by downshifting the tractor transmission to a lower gear. Accordingly, the routine limits the amount by which the implement is raised in response to reduce engine speed by limiting the RERR value to the value ELIM in step 218.

Furthermore, with steps 220 and 222, which are optional, the routine generates a signal (DLIT=1) when the slip error value SERR is less than the engine error value RERR and when LCONT equals 1, as set in step 268, when the implement is being controlled in response to the combined load error value, LERR. A signal representing the DLIT value may be communicated to an indicator device (not shown) in the tractor cab to provide the operator with a signal when it is appropriate to downshift the transmission to a lower gear. As an added feature, step 214 prevents generation of this warning signal when the tractor is not moving. Without steps 220 and 222, the routine would proceed from step 218 to step 224.

At step 224, an activity gain value, GAIN, is calculated from the equation GAIN=A(4)×0.004+0.5, where A(4) is a value representing the signal from the activity control transducer 72. Since the A(4) value may be varied from 0 to 255, the factors 0.004 and 0.5 are applied to A(4) to obtain GAIN values in a desired range of 0.5 to 1.5. In step 226, an interim combined error value, COMM, is determined by the equation COMM=LCOM−SERR−RERR. Next, at step 228, an interim combined load error value, LERR, is calculated from the equation LERR=(−COMM+DRAFT−(FDBK−SFPOS)×0.4)×GAIN. The normalized position feedback term (FDBK−SFPOS) helps to prevent overshooting and rough hitch and implement movements. The (0.4) value is a constant sensitivity value which is optimized for good depth control during tractor pitching in unevenly contoured terrain and during operation in soil of non-uniform density. As described previously, the SFPOS value is redetermined to establish a new reference value for the normalized position feedback term in response to changes in the load command, LCOM, value.

In step 230, if the rate limited position command value, RCOM, is greater than a value, for example, 130, then a dynamic feedback gain value, DGAIN, is set equal to 0. The RCOM value is initially 0 from step 99 or is determined in steps 252 or 254 of a previous cycle of the routine. Then, in step 232, if the filtered draft value, FDRFT, from step 184, is greater than 85% of the load command value, LCOM, then DGAIN is set equal to 1. Then, at step 234, the LERR value is recalculated according to the equation LERR=(LERR−(FDBK−FPOS)×DGAIN)×4, where DGAIN is a dynamic feedback gain factor which is applied to the negative feedback factor, (FDBK−FPOS), and where 4 is an overall loop gain factor. The overall loop gain factor may vary over a range of values, for example, 3-5, depending upon the particular hitch, implement and vehicle that are involved.

Thus, the ultimate combined load error value, LERR, in step 234 is an arithmetic function or combination of the load command value, LCOM, from step 186, the draft force value, DRAFT, from step 182, the rate limited engine speed error, RERR, from steps 160 or 218, the wheel slip error value SERR from step 126, the implement position value, FDBK, from step 170, the filtered position feedback value, FPOS, from step 180, and the GAIN value from step 224. The position feedback adds stability to the system operation. By changing the GAIN value by manipulating the activity control 70 and its corresponding transducer 72, the overall sensitivity or activity of the control system may be adjusted, at least with respect to the component values of the LERR value. In step 234, the term (FDBK−FPOS) provides a negative feedback proportional to the rate of change of the implement position which adds further stability to the system by preventing overshooting of the implement when rapid changes in draft force occur.

Step 230 operates to reduce the effect of the dynamic feedback term in step 234 when the implement is raised out of the ground so that rapid implement movement can be obtained. Step 232 operates to increase the effect of the dynamic feedback term in step 234 when the implement is in the ground and the average sensed draft force represented by FDRFT achieves 85% of the desired draft force level represented by the LCOM value.

Note that regardless of the cause, a reduced tractor velocity can cause a decrease in the draft force and a corresponding decrease in the DRAFT value set at step 182. The control system tends to respond to a decreased DRAFT value by lowering the implement, just as in a conventional pure draft responsive system. Depending on the initial cause, this implement lowering can further reduce the ground speed of the tractor, thus reducing the engine speed, and possibly stalling the engine. However, this implement lowering response is counteracted in the present control system in that reduced travel velocity also causes an increase in the filtered rate limited engine speed error value, RERR, which, through steps 226 and 228, offsets the decrease in the DRAFT value, thus counteracting the draft force responsive implement lowering and helping to prevent engine stalling.

Also note that the combined or load error value, LERR, will increase if the wheel slippage increases, as represented by an increasing SERR value in step 226. This slippage induced increase in the LERR value tends to raise the implement, thus shifting weight to the rear wheels, increasing the traction and reducing the slippage thereof. Unlike the situation with respect to engine speed, wherein the engine speed induces implement raising is limited by the operation of steps 188, 190, 216 and 218, the amount by which this control system will raise the implement in response to wheel slip is not limited. In otherwords, to prevent the tractor from getting stuck, the control system will raise the implement entirely out of the ground.

Thus, the present control system includes two slip-related aspects, the first related to weight transfer and the second related to preventing the tractor from becoming stuck. Also, in wet or low traction soil, this control system will establish a maximum implement depth.

Next, in a portion of the routine represented by step 236, upper and lower limits 255 and −254, respectively, are established for the LERR value to prevent register overflow. Then, at step 238, the position command value, PCOM, is derived from the value of A(5) which is the output of the operator controlled position command sensor or transducer 54 and which represents a desired position of the implement. Next, at step 240, a lower position limit value, LLIM, is calculated from the equation LLIM=(A(2)×0.6)+3, A(2) representing the output of the operator-controlled lower limit transducer 53 which may be positioned at a suitable location in the operator's compartment. The factors 0.6 and 3 are chosen so that the lower limit value LLIM may be varied over the lower 60% of the range of positions which the PCOM value represents. Next, at step 242, an upper position limit value, ULIM, is calculated from the equation ULIM=(A(3)×0.3)+178, A(3) representing the output of the operator-controlled upper position limit transducer 51 also located in the operator's compartment. The factors 0.3 and 178 are chosen so that the upper limit value ULIM may be varied over the upper 30% of the range of positions represented by the PCOM value. Next, in a portion of the routine represented by step 244, the LLIM and ULIM values are established as the minimum and maximum values between which the PCOM value may range. In the manner, the position command value, PCOM, is limited to between the lower and upper limit values LLIM and ULIM, regardless of the position of the position command lever 52 and its transducer 54. Of course, an alternative to this would be to physically limit the position range of the position lever 52 with mechanical stops.

Next, in step 246, the status of an operator-controlled implement lift/lower rate selecting switch 74 is examined. If the switch 74 is closed, as when the operator desires a rapid implement movement rate, then a FASTSL flag value is set equal to 1. If the switch 74 is open, as when the operator desires a slow implement movement rate, then the FASTSL flag value is set equal to 0.

Then, step 248 operates to bypass the rate limiter steps 250–254 and proceed directly to step 256 if the system is in its load control mode (as represented when LCONT=1 in step 268) or if the PCOM value is less than the FDBK value, as would be the case where the implement is resting on the ground. However, if these conditions are not met, then the routine proceeds directly to step 250 where the routine is routed to steps 252 or 254, depending upon whether the FASTSL value equals 1 or 0, respectively. In the portion of the routine represented by step 252, the PCOM value is examined to determine whether it has increased or decreased from its value in a previous cycle of the routine. If it has increased, then a rate limited position command value, RCOM, is incrementally increased during each cycle of the routine by a set amount, 1.2, which corresponds to a rate of implement movement which would result in the implement being moved through its full range of travel in a certain time period, for example, 2 seconds. Similarly, the RCOM value is decremented if the PCOM value has decreased. The incrementing or decrementing of the RCOM value continues until the RCOM value attains the new PCOM value. In the portion of the routine represented by step 254, the RCOM value is similarly incremented or decremented, except that it is incrementally changed by an amount, 0.7, which corresponds to a rate of implement movement which would result in the implement being moved through its full range of travel in a longer time period, for example, 4 seconds. Thus, steps 250–254 provide for a variable rate of implement lifting or lowering which is independent of the amount of weight or type of implement moved by the system within the limitations of the hydraulic system. After steps 252 or 254, the routine proceeds to step 256.

At step 256, the position error value, PERR, is calculated from the equation PERR=(RCOM−FDBK)×7, where the RCOM value is set by previous steps 238, 244, 252 and 254, where the FDBK value is set by step 170 and where 7 is a position gain value which is chosen so that the system has a satisfactory sensitivity to the difference between the desired and sensed implement positions. Then, at a portion of the routine represented by step 258, upper and lower limits +255 and −255, respectively, are established for the range of PERR values to prevent overflow problems in the register containing the PERR value.

Next, in step 260, the PERR and LERR values are compared. If the PERR value is larger than the LERR value, then the valve command value, HVCO, is set equal to the PERR value in step 262. On the other hand, if the LERR value is greater than or equal to the PERR value, then HVCO is set equal to the LERR value in step 264. Thus, depending upon which of the values PERR and LERR is most positive, the control system operates to raise or lower the implement in response to one or the other of the position error signals, PERR, or the load or combined error signal, LERR.

The digital HVCO value from steps 262 or 264 is converted to a pulse width modulated signal via PIT 320, for example, and is applied to the torque motor of the control value 42 so that an increase in the HVCO value will tend to raise the implement (not shown). The speed of implement movement will be proportional to the magnitude of the HVCO value. Raising the implement reduces the LERR or PERR value and reduces the HVCO value until a steady state condition is obtained wherein the HVCO value is minimized. Conversely, a lowering of the HVCO value causes a lowering of the implement until a new steady state condition is achieved.

After steps 262 or 264, the routine proceeds to step 266, where a position differential value, PERR−PHYS, is compared to a load differential value, LERR−LHYS, where LERR is the combined load error value from step 234, where LHYS is a load hysteresis value which is initially 0 in step 99 or is set equal to 0 or 10 in steps 268 or 270, respectively, where PERR is the position error value from step 256, and where PHYS is a position hysteresis value set initially at zero in step 99 or is set equal to 10 or 0 in steps 268 or 270, respectively. If, in step 266, the position differential value is less than or equal to the load differential value, (as would be the case when the LERR value is the dominating error value in steps 260 and 264), then the routine proceeds to step 268 where the flag value LCONT is set equal to 1, the load light value LLIT is set equal to 1, the position light value PLIT is set equal to 0, the position hysteresis value PHYS is set equal to 10 and the load hysteresis value is set equal to 0. The LCONT value is set equal to 1 so that it is possible to activate the downshift light through the operation of steps 226 and 228. The load light value LLIT is set equal to 1 so a signal representing the LLIT value may be communicated to a load control mode indicator device 80, located in an observable position in the tractor cab, to inform the vehicle operator that the implement is being controlled in response to the combined load error value, LERR. Conversely, the PLIT value is set equal to 0 so that a position control mode indicator device 82, also located in an observable position in the tractor cab, may be disabled in this situation. The position hysteresis and load hysteresis values, PHYS and LHYS, are set equal to 10 and 0, respectively, so that during subsequent cycles of the routine, step 266 will continue to direct the routine to step 268 until the control system switches to a position error dominated control mode due to a significant increase in the PERR value relative to the LERR value. In this manner, a possibly annoying intermittant or flickering operation of the load and position control mode indicator devices 80 and 82 may be prevented.

If, however, in step 266, the position differential value is greater than the load differential value, (as would be the case when the PERR value is the dominating error value in steps 260 and 262), then the routine proceeds to step 270, where the flag value, LCONT, is set equal to 0, the LLIT value is set equal to 0, the PLIT value is set equal to 1, the PHYS value is set equal to 0, and the LHYS value is set equal to 10. In this case, the LCONT value is set equal to 0 to prevent the actuation of the downshift indicator device through the operation of steps 220 and 222. The LLIT and PLIT values are set equal to 0 and 1, respectively, so that the corresponding load and position control indicators 80 and 82 may be disabled and energized, respectively, to give an indication that the system is operating in a position error responsive mode. The hysteresis values, PHYS and LHYS are set equal to 0 and 10, respectively, to prevent intermittant operation of the load and position control mode indicators 80 and 82, in a manner similar to that previously described with reference to step 268. After steps 268 or 270, the routine returns to step 100 via step 272. The entire routine may be repeated at a 100 Hz rate, although other repetition rates may also be suitable.

Due to step 260, where one or the other of the LERR or PERR values is selected, this control system is essentially a split control system, rather than a mixed control system where the control signal is a mixture of the position error, PERR, and combined load error, LERR. As a result, a steady state or equilibrium condition may be attained wherein only one of the LERR or PERR values is maintained at zero, while the other value could be negative. In this case, the negative error value is ignored by the most positive select function of steps 260–264. An example of this situation is where the PERR value is 0 because the position command, PCOM, and position feedback, FDBK, values are equal, but where the load error, LERR, value is negative because the load command, LCOM, value represents a larger draft force than the actual sensed draft force represented by the DRAFT value. In order to lower the implement to operate at an increased amount of draft force, the operator must reduce the position command value, PCOM, so that the PERR value in step 256 becomes at least as negative as the LERR value, thus permitting steps 260–264 to select less negative of the LERR and PERR values to thereby lower the implement and increase the draft force operating point. The PLIT value generated by step 270 can provide the operator with an indication of when such a situation occurs by informing him that the control system is in the position error mode and thus will not respond to an increased LCOM value unless the PCOM value is also adjusted.

An analogous situation occurs when the LERR value is 0 and the operator desires to lower the implement by reducing the PCOM value. Except in this case, the load light value, LLIT, is set equal to 1 by step 268 to inform the operator that the control system is in its load control mode and that the LCOM value must be increased to permit lowering of the implement through lowering of the PCOM value.

Note, however, that the hitch will be automatically raised whenever either of the LERR or PERR values is increased to a value which is more positive than the other. This permits the control system to automatically raise the implement to reduce wheel slippage and engine stalling, as desired.

The conversion of the above flow chart into a standard language for implementing the algorithm described by the flow chart in a digital data processor, such as the microprocessor 310, will be evident to those with ordinary skill in the art.

It should also be noted that the particular numerical values given in the preceeding description are merely exemplary and could be changed for many reasons, including tailoring the system for a different implement or vehicle, without departing from the scope of the invention. It would also be within the scope of this invention to control a towed implement with the previously described drawbar draft sensing, or with a T-bar on the draft links and draft link sensing, with position sensing on a remote cylinder of the towed implement and with another electrically-operated 4-way, 3-position control valve for controlling fluid communication to the remote cylinder or with a diverter valve for diverting fluid from a solenoid-operated rockshaft control valve to the remote cylinder on the towed implement. Similarly, it is within the scope of this invention to control a semi-integral implement with one or more remote cylinders in series with the rockshaft cylinder with draft sensing in the hitch draft linkages and with position sensing in the rockshaft or in the rockshaft cylinder.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. In a vehicle having connecting means for attaching a ground-penetrating implement thereto and actuating means for raising and lowering the implement to vary the ground penetration thereof in response to signals applied to an input thereof:
    sensing means for sensing an operating parameter of a machine system comprising the vehicle, the connecting means and the implement, and for generating a parameter signal representative thereof;
    set point means for deriving a parameter set point signal from the parameter signal;
    difference means for generating a parameter error signal representing a difference between the parameter signal and the parameter set point signal; and
    means for converting the parameter error signal to a control signal and for applying the control signal to the input of the actuating means, the actuating means being adapted to move the implement in response to the control signal.

2. The control system of claim 1, further comprising:
    operator-adjustable command means for generating a command signal representing a desired magnitude of a further operating parameter of the machine system; and
    means for momentarily modifying the parameter error signal in response to a predetermined operator-induced change in the command signal.

3. The control system of claim 1, further comprising:
    operator-adjustable command means for generating a command signal representing a desired magnitude of a further operating parameter of the machine system; and
    means for redetermining the parameter set point signal from a filtered signal generated a predetermined delay time period after occurance of said predetermined change in the command signal.

4. The control system of claim 3, wherein:
    the duration of the delay time period is a function of the magnitude of the change in the command signal.

5. In a vehicle having connecting means for attaching a ground-penetrating implement thereto and actuating means for raising and lowering the implement to vary the ground penetration thereof in response to signals applied to an input thereof, a control system comprising means for generating a parameter error signal representing a difference between a sensed value of an operating parameter of a machine system comprising the vehicle, the connecting means and the implement and a reference value of said parameter;

operator-adjustable command means for generating a command signal representing a desired magnitude of a further operating parameter of the machine system;

means for momentarily modifying the parameter error signal in response to a predetermined operator-induced change in the command signal;

means for redetermining the reference value a predetermined time period after occurance of said predetermined change in the command signal; and means for converting at least the parameter error signal to a control signal and for applying the control signal to the input of the actuating means, the actuating means being adapted to move the implement in response to the control signal.

6. In a vehicle having a driven wheel, connecting means for attaching a ground-penetrating implement thereto and actuating means for raising and lowering the implement to vary the ground penetration thereof in response to signals applied to an input thereof, a control system comprising:

means for generating at least one parameter signal derived from at least one sensed operating parameter of a machine system comprising the vehicle, the connecting means and the implement;

operator-adjustable command means for generating a command signal representing a desired magnitude of a further operating parameter of the machine system;

means for generating a position feedback signal derived from a sensed position of the implement and from a reference position value;

means for redetermining the reference position value in response to changes in the command signal, means for generating a combined signal derived by combining at least the parameter signal and the position signal; and means for applying the combined signal to the input of the actuating means, the actuating means being adapted to move the implement in response to the combined signal.

7. In a vehicle having a driven wheel, connecting means for attaching a ground-penetrating implement thereto and actuating means for raising and lowering the implement to vary the ground penetration thereof in response to signals applied to an input thereof, a control system comprising:

means for generating a parameter signal derived from at least one sensed operating parameter of a machine system comprising the vehicle, the connecting means and the implement;

means for generating a position signal representing an actual position of the implement;

means for generating a filtered position signal derived by filtering the position signal;

means for storing a selected filtered position signal;

means for generating a normalized feedback value representing a difference between the position signal and the stored filtered position value;

means for generating a combined signal derived by combining at least the parameter signal and the normalized feedback values, and means for applying the combined signal to the input of the actuating means, the actuating means being adapted to move the implement in response to the combined signal.

8. In a vehicle having connecting means for attaching a ground-penetrating implement thereto and actuating means for raising and lowering the implement to vary the ground penetration thereof in response to signals applied to an input thereof, a control system comprising:

a first parameter means for generating a first parameter error signal derived from at least one sensed operating parameter of a machine system comprising the vehicle, the connecting means and the implement;

a second parameter means for generating a second parameter error signal derived from at least another sensed operating parameter of the machine system;

selection means comaring the first and second parameter error signals with each other and for automatically selecting one of the first and second parameter error signals when a predetermined relationship therebetween occurs;

first and second operator-detectable indicators;

means for energizing the first indicator when the first parameter error signal is selected and for energizing the second indicator when the second parameter error signal is selected;

threshold means operable when the selected signal is changing from one to the other of the parameter error signals for preventing changes in energization of the indicator devices unless the magnitude of the other parameter error signal exceeds a predetermined threshold level; and means for applying the selected signal to the input of the actuating means, the actuating means being adapted to move the implement in response to the selected signal.

9. In a vehicle having an engine, connecting means for attaching a ground-penetrating implement thereto and actuating means for raising and lowering the implement to vary the ground penetration thereof in response to signals applied to an input thereof, a control system comprising:

means for generating a first error signal derived from an engine speed error signal repesenting a difference between a sensed and a desired engine speed;

position means for generating a position error signal with a magnitude proportional to a difference between an actual and a desired position of the implement;

selecting means comparing the first error and the position error signals with each other and for automatically selecting one of the first error and position error signals when a predetermined relationship therebetween occurs; and means for applying the selected error signal to the input of the actuating means, the actuating means being adapted to move the implement in response to the selected error signal.

10. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel;

parameter means for generating a parameter signal derived from a sensed operating parameter other than wheel slippage in a machine system comprising the vehicle, the connecting means and the implement;

selection means for comparing the slip error and parameter signals with each other and for automatically selecting one of the slip error and parameter signals when a predetermined relationship therebetween occurs; and means for applying the selected signal to the input of the actuating means, the actuating means being adapted to move the implement in response to the selected signal.

11. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel;

position means for generating a position error signal with a magnitude proportional to a difference between an actual and a desired position of the implement;

selecting means for comparing the slip error and position error signals with each other and for selecting one of the slip error and position error signals when a predetermined relationship therebetween occurs; and means for applying the selected error signal to the input of the actuating means, the actuating means being adapted to move the implement in response to the selected error signal.

12. In a vehicle having connecting means for attaching a ground-penetrating implement thereto and actuating means for raising and lowering the implement to vary the ground penetration thereof in response to signals applied to an input thereof, a control system comprising:

first, second and third parameter means for generating first, second and third parameter signals, each derived from a separate sensed operating parameter of a machine system comprising the vehicle, the connecting means and the implement;

means for generating a combined signal derived by combining the first and second parameter signals;

selection means for comparing the magnitude of the combined signal with the magnitude of the third signal and for automatically selecting one of the combined and third signals when a predetermined relationship between the magnitudes thereof occurs; and means for applying the selected signal to the input of the actuating means, the actuating means being adapted to move the implement in response to the selected signal.

13. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

draft means for generating a draft error signal derived from a sensed draft force produced by interaction between the implement and the ground and from a reference draft force;

engine speed means for generating an engine speed error signal indicative of a difference between a sensed and a desired engine speed;

position means for generating a position error signal with a magnitude proportional to a difference between an actual and a desired position of the implement;

signal combining means for generating a combined signal derived by combining the draft error and engine speed error signals;

selecting means for selecting one of the combined error and position error signals when a predetermined relationship therebetween occurs; and means for applying the selected error signal to the input of the actuating means, the actuating means being adapted to move the implement in response to the selected error signal.

14. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel;

draft means for generating a draft error signal derived from a sensed draft force produced by interaction between the implement and the ground and from a reference draft force;

position means for generating a position error signal with a magnitude proportional to a difference between an actual and a desired position of the implement;

signal combining means for generating a combined signal derived by combining the slip error and draft error signals;

selecting means for selecting one of the combined error and position error signals when a predetermined relationship therebetween occurs; and means for applying the selected error signal to the input of the actuating means, the actuating means being adapted to move the implement in response to the selected error signal.

15. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

wheel slip means for generating a slip error signal indicative of the amount of slippage of the driven wheel;

engine speed means for generating an engine speed error signal indicative of a difference between a sensed and a desired engine speed;

position means for generating a position error signal with a magnitude proportional to a difference between an actual and a desired position of the implement;

signal combining means for generating a combined signal derived by combining the slip error and engine speed error signals;

selecting means for selecting one of the combined error and position error signals when a predetermined relationship therebetween occurs; and means for applying the selected error signal to the input of the actuating means, the actuating means being adapted to move the implement in response to the selected error signal.

16. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

wheel slip means for generating a slip error signal indicative of the amount of slippage of the driven wheel;

draft means for generating a draft error signal derived from a sensed draft force produced by interaction between the implement and the ground and from a reference draft force;

engine speed means for generating an engine speed error signal indicative of a difference between a sensed and a desired engine speed;

position means for generating a position error signal with a magnitude proportional to a difference between an actual and a desired position of the implement;

signal combining means for generating a combined signal derived by combining the slip error, draft error and engine speed error signals;

selecting means for selecting one of the combined error and position error signals when a predetermined relationship therebetween occurs; and means for applying the selected error signal to the input of the actuating means, the actuating means being adapted to move the implement in response to the selected error signal.

17. In a vehicle having an engine and connecting means for attaching a ground-penetrating implement thereto, a control system comprising:

implement draft force responsive means for increasing implement depth in response to decreases in sensed draft force due to decreased vehicle velocity;

means for counteracting the draft force responsive means in response to a reduced engine speed, and means for limiting the effect of the counteracting means to an amount which is proportional to a desired amount of implement draft force.

18. In a vehicle having connecting means for attaching a ground-penetrating implement thereto and actuating means for raising and lowering the implement to vary the ground penetration thereof in response to signals applied to an input thereof, a control system comprising:

means for generating a filtered draft signal derived from periodically sampled unfiltered values of sensed draft force;

means for setting a variable gain factor to preselected values, depending upon the value of the filtered draft signal;

means for generating a control signal derived from at least the variable gain factor and the periodically sampled unfiltered draft force values; and means for applying the control signal to the input of the actuating means, the actuating means being adapted to move the implement in response to the control signal.

19. In an engine-driven vehicle having connecting means for attaching a ground-penetrating implement thereto and actuating means for raising and lowering the implement to vary the ground penetration thereof in response to signals applied to an input thereof, a control system comprising:

engine speed means for periodically generating an engine speed error signal indicative of a difference between a sensed and a reference engine speed;

means for generating an increasing engine error signal which increases periodically and incrementally by a first increment in response to increasing engine speed error;

means for generating a decreasing engine error signal which decreases periodically and incrementally by a second increment smaller than the first increment in response to decreasing engine speed error; and means for generating a control signal derived from at least one of the increasing and decreasing engine error signals and for applying the control signal to the input of the actuating means, the actuating means being adapted to move the implement in response thereto.

20. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel;

at least one parameter means for generating at least one parameter signal derived from at least one sensed operating parameter, other than wheel slippage, of a machine system comprising the vehicle, the connecting means and the implement;

signal combining means for generating a combined signal derived by combining the slip error signal and the at least one parameter signal; and means for applying the combined signal to the input of the actuating means, the actuating means being adapted to move the implement in response to the combined signal.

21. In a vehicle having an engine, a driven wheel, connecting means for attaching a ground-penetrating implement thereto, and actuating means for raising and lowering the implement to vary the ground penetration thereof in response to signals applied to an input thereof, a control system comprising; first parameter means for generating a first parameter error signal having a magnitude representing a difference between sensed and desired magnitudes of a first operating parameter of a machine system comprising the vehicle, the connecting means and the implement;

second parameter means for generating a second parameter error signal having a magnitude representing a difference between sensed and desired magnitudes of a second operating parameter of the machine system;

at least a third parameter means for generating at least a third parameter error signal having a magnitude representing a difference between sensed and desired magnitudes of at least a third sensed operating parameter of the machine system;

signal combining means for generating a combined signal derived by combining at least the first, second and third parameter error signals; and means for applying the combined signal to the input of the actuating means, the actuating means being adapted to move the implement in response to the combined signal.

22. In an engine-driven vehicle having connecting means for attaching a ground-penetrating implement thereto, and actuating means for raising and lowering the implement to vary the ground penetration thereof in response to signals applied to an input thereof, a control system comprising:

draft means for generating a draft error signal derived from a sensed draft force produced by interaction between the implement and the ground and from a reference draft force;

engine speed means for generating an engine speed error signal indicative of a difference between a sensed and a desired engine speed;

signal combining means for generating a combined signal derived by combining the draft error and engine speed error signals; and means for applying the combined signal to the input of the actuating means, the actuating means being adapted to move the implement in response to the combined signal.

23. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel;

draft means for generating a draft signal derived from at least a sensed draft force produced by interaction between the implement and the ground;

signal combining means for generating a combined signal derived by arithmetically combining the slip error signal with the draft signal; and means for applying the combined signal to the input of the actuating means, the actuating means being adapted to move the implement in response to the combined signal.

24. The control system of claim 23, further comprising:

means for maintaining the slip error signal not less than a predetermined minimum value to prevent a reduction in the magnitude of the combined signal and a corresponding increase in implement depth when the slip error decreases below a minimum value.

25. The invention of claim 23, wherein:

the connecting means comprises a movable hitch coupled between the implement and the vehicle, the actuation means being coupled between the hitch and the vehicle and being capable of moving the hitch to thereby raise and lower the implement.

26. In a vehicle having a driven wheel, connecting means for attaching a ground-penetrating implement thereto and actuating means for raising a lowering the implement to vary the ground penetration thereof in response to signals applied to an input thereof, a control system comprising:

wheel slip means for generating a slip error signal indicative of the amount of wheel slippage of a driven wheel of the vehicle;

means for selecting a predetermined slip gain factor from a plurality of slip gain factors, depending upon the magnitude of the slip error signal;

means for generating modified slip error signals derived by multiplying the slip error signal by the selected slip gain factor; and means for deriving a control signal from at least the modified slip error signal and for applying the control signal to the input of the actuating means, the actuating means being adapted to move the implement in response to the control signal.

27. In a vehicle having a driven wheel, connecting means for attaching a ground-penetrating implement thereto and actuating means for raising and lowering the implement to vary ground penetration thereof in response to signals applied to an input thereof, a control system comprising:

a draft sensor for generating a sensed draft signal derived from a sensed draft force produced by implement-ground interaction;

reference means for generating a reference draft signal representing a desired draft force level;

means for sensing slippage of the driven wheel and for generating a slip error signal representing a difference between a sensed wheel slippage and a reference amount of wheel slippage, signal combining means for generating a combined signal derived by arithmetically combining the sensed draft signal, the reference draft signal and slip error signals; and means for applying the combined signal to the input of the actuating means, the actuating means being adapted to move the implement in response to the combined signal.

28. The control system of claim 27, wherein the actuating means comprises:

a source of fluid pressure;

a hydraulic piston for raising the implement in response to fluid communicated thereto; and electrohydraulic valve means with an input for receiving the combined signal and for controlling the rate of fluid flow between the fluid pressure source and the piston as a function of the magnitude of the combined signal.

29. In a vehicle having an engine, connecting means for attaching a ground-penetrating implement thereto and actuating means for raising and lowering the implement to vary the ground penetration thereof in response to control signals applied to an input thereof, a control system comprising;

a draft sensor for generating a draft signal representing a sensed draft force produced by implement-ground interaction;

operator-adjustable load command means for generating a load command signal representing a desired draft force;

an engine speed means for generating an engine speed error signal representing a difference between a sensed and desired engine speed;

signal combining means for generating a combined signal derived by arithmetically combining the draft signal, the load command signal and the engine speed error signal;

means for applying the combined signal to the input of the actuating means, the actuating means being adapted to move the implement in response to the combined signal; and means for momentarily modifying the engine speed error signal in response to a predetermined operator-induced change in the load command signal.

30. In a vehicle having an engine, a driven wheel, connecting means for attaching a ground-penetrating implement thereto and actuating means for raising and lowering the implement to vary the ground penetration thereof in response to signals applied to an input thereof, a control system comprising:

a draft sensor for generating a draft signal indicative of a sensed draft force produced by interaction between the implement and the ground;

operator-adjustable load command means for generating a load command signal indicative of a desired amount of draft force;

engine speed sensing means for generating an engine speed signal representing the speed of the vehicle engine;

reference means for generating a reference engine speed signal;

threshold means for generating a threshold signal representing a predetermined change in vehicle engine speed;

arithmetic means for generating an engine speed error signal as a function of the engine speed, engine speed reference and threshold signals;

signal combining means for generating a combined signal derived by arithmetically combining the draft, load command and engine speed error signals; and means for applying the combined signal to the input of the actuating means, the actuating means being adapted to move the implement in response to the combined signal.

31. The control system of claim 30, further comprising:

means for momentarily modifying the engine error signal in response to a predetermined change in the load command signal.

32. The control system of claim 30, further comprising:

means for redetermining the threshold signal based on engine speed and reference engine speed signals generated a predetermined time interval after adjustment of the load command means.

33. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

wheel slip means for generating a slip error signal indicative of the amount of slippage of the driven wheel;

draft means for generating a draft error signal derived from a sensed draft force produced by interaction between the implement and the ground and from a reference draft force;

engine speed means for generating an engine speed error signal indicative of a difference between a sensed and a desired engine speed;

signal combining means for generating a combined signal derived by combining the slip error, the draft error and engine speed error signals; and means for applying the combined signal to the input of the actuating means, the actuating means being adapted to move the implement in response to the combined signal.

34. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

a draft sensor for generating a draft signal derived from a sensed draft force produced by interaction between the implement and the ground;

wheel slip means for generating a slip error signal representative of slippage of the driven wheel;

engine speed means for generating an engine speed error signal indicative of a difference between a sensed and a desired engine speed;

signal combining means for generating a combined signal derived by arithmetically combining the draft signal with the engine speed error and the slip error signals; and means for applying the combined signal to the input of the actuating means, the actuating means being adapted to move the implement in response to the combined signal.

35. The control system of claim 34, wherein the engine speed means comprises:

an engine speed sensor coupled to the engine for generating a sensed engine speed signal indicative of an actual speed of the engine;

means for generating a reference engine speed signal representing a designated speed of the vehicle engine;

means for generating a threshold engine speed signal representing a predetermined difference between the sensed and reference engine speed signals; and means for generating the engine speed error signal as an arithmetic function of the sensed engine speed signal, the reference engine speed signal and the threshold engine speed signal.

36. The control system of claim 35, wherein:

the reference engine speed generator means includes speed control means for controlling the vehicle engine and sensing means coupled to the speed control means for sensing the operational status of the speed control means and for converting the sensed status to the reference engine speed signal.

37. The control system of claim 34, wherein the actuating means comprises:

a source of fluid pressure;

a hydraulic piston for raising the implement in response to fluid communicated thereto; and electrohydraulic valve means responsive to the combined signal for controlling the rate of fluid flow between the fluid pressure source and the piston as a function of the magnitude of the combined signal.

38. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

wheel slip means for generating a slip error signal indicative of the amount of slippage of the driven wheel;

a draft sensor for generating a draft signal representing a draft force produced by interaction between the implement and the ground;

operator-adjustable load command means for generating a load command signal indicative of a desired amount of draft force;

means for generating a draft error signal representing a difference between the draft and load command signals;

engine speed means for generating an engine speed error signal indicative of a difference between a sensed and a desired engine speed;

position means for generating a position error signal with a magnitude proportional to a difference between an actual and a desired position of the implement;

signal combining means for generating a combined signal derived by combining the slip error, the draft, the load command and engine speed error signals;

selecting means for selecting one of the combined error and position error signals when a predetermined relationship therebetween occurs; and means for applying the selected error signal to the input of the actuating means, the actuating means being adapted to move the implement in response to the selected error signal.

39. In a vehicle having an engine, a driven wheel, connecting means for attaching a ground penetrating implement thereto and actuating means for raising and lowering the implement to vary the ground penetration thereof in response to signals applied to an input thereof, a control system comprising:

a draft sensor for generating a draft signal derived from at least a sensed draft force produced by interaction between the implement and the ground;

a wheel slip means for generating a slip error signal indicative of the amount of slippage of the driven wheel;

engine speed means for generating an engine speed error signal indicative of a difference between a sensed and a desired engine speed;

signal combining means for generating a combined signal derived by arithmetically combining the draft signal with the engine speed error and the slip error signals;

a position means for generating a position error signal with a magnitude proportional to a difference between an actual and a desired position of the implement;

selecting means for selecting one of the combined error and position error signals when a predetermined relationship therebetween occurs;

means for applying the selected error signal to the input of the actuating means, the actuating means being adapted to move the implement in response to the selected error signal;

means for generating a draft limit signal proportional to a desired amount of draft force;

means for limiting the magnitude of the engine speed error signal to the magnitude of the draft limit signal; and means for generating a downshift signal when the engine speed error signal is limited by the limiting means concurrently with the slip error signal having a lesser magnitude than that of the engine speed error signal.

40. In a vehicle having an engine, a driven wheel, connecting means for attaching a ground-penetrating implement thereto and actuating means for raising and lowering the implement in response to signals applied to an input thereof, a control system comprising:

draft force means for generating a draft signal derived from at least a sensed draft force produced by implement-ground interaction;

wheel slip means for generating a slip error signal indicative of the amount of slippage of the driven wheel;

engine speed means for generating an engine speed error signal indicative of a difference between sensed and a desired speed of the vehicle engine;

signal combining means for generating a combined signal derived by arithmetically combining the above signals;

a position monitor for generating a position error signal with a magnitude proportional to a difference between a sensed and a desired position of the implement;

selecting means for selecting one of the combined and position error signals according to a predetermined relationship therebetween; and means for applying the selected signal to the input of the actuating means, the actuating means being adapted to move the implement as a function of the selected one signal.

41. The control system of claim 40, wherein the selecting means comprises means for selecting the most positive of the combined and position error signals.

42. The control system of claim 40, wherein the engine speed means comprises:

an engine speed sensor coupled to the engine for generating a sensed engine speed signal indicative of an actual speed of the engine;

means for generating a reference engine speed signal representing a designated speed of the vehicle engine;

means for generating a threshold engine speed signal representing a difference between the sensed and reference engine speed signals; and means for generating the engine speed error signal as an arithmetic function of the sensed engine speed signals, the reference engine speed signal and the threshold engine speed signal.

43. The control system of claim 40, further comprising:

operator-controlled means for generating a load command signal representing a desired amount of draft force;

means for generating a draft limit signal proportional to the load command signal; and means for limiting the magnitude of the engine speed error signal to the magnitude of the draft limit signal.

44. In a vehicle having connecting means for attaching a ground-penetrating implement thereto and actuating means for raising and lowering the implement to vary the ground penetration thereof in response to signals applied to an input thereof:

means for generating a parameter signal representing a sensed operating parameter of a machine system comprising the vehicle, the connecting means and the implement;

set point means for deriving a parameter set point signal from the parameter signal;

difference means for generating a parameter error signal representing a difference between the parameter signal and the parameter set point signal;

means for converting the parameter error signal to a control signal and for applying the control signal to the input of the actuating means, the actuating means being adapted to move the implement in response to the control signal;

operator-adjustable command means for generating a command signal representing a desired magnitude of a further operating parameter of the machine system; and means for redetermining the parameter set point signal from a filtered signal generated a predetermined delay time period after occurrence of said predetermined change in the command signal, the duration of the delay time period being a function of the magnitude of the change in the command signal.

45. In a vehicle having connecting means for attaching a ground-penetrating implement thereto and actuating means for raising and lowering the implement to vary the ground penetration thereof in response to signals applied to an input thereof:

means for generating a parameter error signal representing a difference between a sensed value of an operating parameter of a machine system comprising the vehicle, the connecting means and the implement and a reference value of said parameter;

operator-adjustable command means for generating a command signal representing a desired magnitude of a further operating parameter of the machine system;

means for momentarily modifying the parameter error signal in response to a predetermined operator-induced change in the command signal;

means for redetermining the reference value a predetermined delay time period after occurrence of said predetermined change in the command signal; and means for converting at least the parameter error signal to a control signal and for applying the control signal to the input of the actuating means, the actuating means being adapted to move the implement in response to the control signal, the duration of the delay time period being a function of the magnitude of the change in the command signal.

46. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel;

draft means for generating a draft signal derived from at least a sensed draft force produced by interaction between the implement and the ground;

signal combining means for generating a combined signal derived by arithmetically combining the slip error signal with the draft signal;

operator-adjustable load command means for generating a load command signal indicative of a desired amount of draft force;

means for momentarily modifying the slip error signal in response to a predetermined operator-induced change in the load command signal; and means for applying the combined signal to the input of the actuating means, the actuating means being adapted to move the implement in response to the combined signal.

47. The control system of claim 59, wherein:
the modifying means comprises means for incrementally and periodically decreasing the slip error signal in a non-linear manner.

48. The control system of claim 46, wherein:
the wheel slip means includes sensor means for generating a wheel slippage signal representing slippage of the driven wheels, means for generating a slip set signal representing a predetermined amount of wheel slippage and difference means for generating the slip error signal representing a difference between the wheel slippage and slip set signal.

49. The control system of claim 48, further comprising:

means for redetermining the slip set signal based on a wheel slippage signal generated a predetermined time interval after adjustment of the load command means.

50. In a vehicle having a driven wheel, connecting means for attaching a ground-penetrating implement thereto and actuating means for raising and lowering the implement to vary the ground penetration thereof in response to signals applied to an input thereof, a control system comprising:

wheel slip means for generating a slip error signal indicative of the amount of slippage of the driven wheel, the wheel slip monitor comprising a ground speed sensor for sensing vehicle ground speed, a wheel speed sensor for sensing the rotation speed of the driven wheel and for converting the rotation speed to a wheel travel velocity, divider means coupled to the ground and wheel speed sensors for generating a ratio signal corresponding to a quotient derived by dividing the ground speed by the travel velocity of the driven wheel, means for generating a slip set signal representing a reference value of wheel slippage, the slip set signal generating means comprising filter means for generating a filtered slip signal derived from periodically generated values of the ratio signal and means for adding a predetermined increment to the filtered slip signal, the resulting signal comprising the slip set signal, and comparator means for producing the slip error signal when the ratio signal exceeds the slip set signal, the magnitude of the slip error signal being proportional to a difference between the ratio and the slip set signals;

draft means for generating a draft signal derived from at least a sensed draft force produced by interaction between the implement and the ground;

signal combining means for generating a combined signal derived by arithmetically combining the slip error signal with the draft signal; and means for applying the combined signal to the input of the actuating means, the actuating means being adapted to move the implement in response to the combined signal.

51. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

a draft sensor for generating a draft signal derived from a sensed draft force produced by interaction between the implement and the ground;

wheel slip means for generating a slip error signal representative of slippage of the driven wheel;

engine speed means for generating an engine speed error signal indicative of a difference between a sensed and a desired engine speed, the engine means comprising an engine speed sensor coupled to the engine for generating a sensed engine speed signal indicative of an actual speed of the engine, means for generating a reference engine speed signal representing a designated speed of the vehicle engine, means for generating a threshold engine speed signal representing a predetermined difference between the sensed and reference engine speed signals, means for maintaining the engine speed error signal not less than a predetermined minimum value, and means for generating the engine speed error signal as an arithmetic function of the sensed engine speed signal, the reference engine speed signal and the threshold engine speed signal;

signal combining means for generating a combined signal derived by arithmetically combining the draft signal with the engine speed error and the slip error signals; and means for applying the combined signal to the input of the actuating means, the actuating means being adapted to move the implement in response to the combined signal.

52. In a vehicle having an engine, a driven wheel, connecting means for attaching a ground-penetrating implement thereto and actuating means for raising and lowering the implement to vary the ground penetration thereof in response to signals applied to an input thereof, a control system comprising:

a draft sensor for generating a draft signal derived from a sensed draft force produced by interaction between the implement and the ground;

wheel slip means for generating a slip error signal representative of slippage of the driven wheel;

engine speed means for generating an engine speed error signal indicative of a difference between a sensed and a desired engine speed, the engine speed means comprising an engine speed sensor coupled to the engine for generating a sensed engine speed signal indicative of an actual speed of the engine, means for generating a reference engine speed signal representing a designated speed of the vehicle engine, means for generating a threshold engine speed signal representing a predetermined difference between the sensed and reference engine speed signals, means for maintaining the threshold engine speed signal not less than a predetermined minimum value, and means for generating the engine speed error signal as an arithmetic function of the sensed engine speed signal, the reference engine speed signal and the threshold engine speed signal;

signal combining means for generating a combined signal derived by arithmetically combining the draft signal with the engine speed error and the slip error signals; and means for applying the combined signal to the input of the actuating means, the actuating means being adapted to move the implement in response to the combined signal.

53. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

a draft sensor for generating a draft signal derived from a sensed draft force produced by interaction between the implement and the ground;

wheel slip means for generating a slip error signal representative of slippage of the driven wheel;

engine speed means for generating an engine speed error signal indicative of a difference between a sensed and a desired engine speed;

signal combining means for generating a combined signal derived by arithmetically combining the draft signal with the engine speed error and the slip error signals;

means for applying the combined signal to the input of the actuating means, the actuating means being adapted to move the implement in response to the combined signal;

operator-controlled means for generating a load command signal representing a desired amount of draft force;

means for generating a draft limit signal as a function of the load command signal; and means for limiting the magnitude of the engine speed error signal to the magnitude of the draft limit signal.

54. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

a draft sensor for generating a draft signal derived from a sensed draft force produced by interaction between the implement and the ground;

wheel slip means for generating a slip error signal representative of slippage of the driven wheel;

engine speed means for generating an engine speed error signal indicative of a difference between a sensed and a desired engine speed;

signal combining means for generating a combined signal derived by arithmetically combining the draft signal with the engine speed error and the slip error signals;

means for applying the combined signal to the input of the actuating means, the actuating means being adapted to move the implement in response to the combined signal;

operator-adjustable load command means for generating a load command signal representing a desired draft force; and means for momentarily modifying the slip error and engine speed error signals in response to a predetermined operator-induced change in the load command signal, the signal combining means generating the combined signal as an arithmetic combination of the draft signal, the load command signal, the wheel slip error signal and the engine speed error signal.

55. In a vehicle having an engine, a driven wheel, connecting means for attaching a ground-penetrating implement thereto, and actuating means for raising and lowering the implement to vary the ground penetration thereof in response to signals applied to an input thereof, a control system comprising:

a draft sensor for generating a draft signal derived from a sensed draft force produced by interaction between the implement and the ground;

wheel slip means for generating a slip error signal representative of slippage of the driven wheel;

engine speed means for generating an engine speed error signal indicative of a difference between a sensed and a desired engine speed, the engine speed means comprising an engine speed sensor coupled to the engine for generating a sensed engine speed signal indicative of an actual speed of the engine and means for generating a reference engine speed signal representing a designated speed of the vehicle engine, the reference engine speed generator means including speed control means for controlling the vehicle engine and sensing means coupled to the speed control means for sensing the operational status of the speed control means and for converting the sensed status to the reference engine speed signal, the engine speed means also comprising means for generating a threshold engine speed signal representing a predetermined difference between the sensed and reference engine speed signals, and means for generating the engine speed error signal as an arithmetic function of the sensed engine speed signal, the reference engine speed signal and the threshold engine speed signal;

means for limiting raising of the implement in response to a predetermined change in the reference engine speed signal;

signal combining means for generating a combined signal derived by arithmetically combining the draft signal with the engine speed error and the slip error signals; and means for applying the command signal to the input of the actuating means, the actuating means being adapted to move the implement in response to the combined signal.

56. In a vehicle having connecting means for attaching a ground-penetrating implement thereto and actuating means for raising and lowering the implement to vary the ground penetration thereof in response to signals applied to an input thereof;

means for generating a parameter signal representing a sensed first operating parameter of a machine system comprising the vehicle, the connecting means and the implement;

operator-adjustable command means for generating a command signal representing a desired magnitude of a further operating parameter of the machine system;

means for momentarily modifying the parameter signal in response to a predetermined operator-induced change in the command signal; and means for converting the parameter signal to a control signal and for applying the control signal to the input of the actuating means, the actuating means being adapted to move the implement in response to the control signal.

* * * * *

UNITED STATES PATENT AND TRADEMARK OFFICE
CERTIFICATE OF CORRECTION

PATENT NO. :  4,518,044
DATED      :  21 May 1985
INVENTOR(S):  Gordon K. Wiegardt et al It is certified that error appears in the above-identified patent and that said Letters Patent is hereby corrected as shown below:

Column 18, line 29, after "thereof", insert -- , a control system comprising --.
Column 20, line 23, delete "comaring" and insert -- comparing --.
Column 25, line 65, delete "a" and insert -- and --.
Column 30, line 59, after "thereof", insert -- , a control system comprising --.
Column 31, line 21, after "thereof", insert -- , a control system comprising --.
Column 32, line 1, delete "59" and insert -- 46 --.
Column 36, line 11, after "thereof", insert -- , a control system comprising --.

Signed and Sealed this

Fourteenth Day of January 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,518,044

DATED : May 21, 1985

INVENTOR(S) : Gordon K. Wiegardt et al

It is certified that error appears in the above-identified patent and that said Letters Patent is hereby corrected as shown below:

Column 11, line 26, "ELIM" should read -- ENGS --.

Signed and Sealed this

Twenty-ninth Day of April 1986

[SEAL]

Attest:

DONALD J. QUIGG

Attesting Officer

Commissioner of Patents and Trademarks